US012812152B2

(12) United States Patent
Andrivon et al.

(10) Patent No.: US 12,812,152 B2
(45) Date of Patent: Nov. 24, 2026

(54) METHOD AND APPARATUS FOR DIMD REGION-WISE ADAPTIVE BLENDING, AND ENCODER/DECODER INCLUDING THE SAME

(71) Applicant: BEIJING XIAOMI MOBILE SOFTWARE CO., LTD., Beijing (CN)

(72) Inventors: Pierre Andrivon, Beijing (CN); Fabrice Leléannec, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/853,700

(22) PCT Filed: Mar. 2, 2023

(86) PCT No.: PCT/CN2023/079416
§ 371 (c)(1),
(2) Date: Oct. 2, 2024

(87) PCT Pub. No.: WO2023/193550
PCT Pub. Date: Oct. 12, 2023

(65) Prior Publication Data

US 2025/0227274 A1 Jul. 10, 2025

(30) Foreign Application Priority Data

Apr. 7, 2022 (EP) .................................... 22167216

(51) Int. Cl.
*H04N 19/44* (2014.01)
*H04N 19/11* (2014.01)
*H04N 19/17* (2014.01)

(52) U.S. Cl.
CPC ............. *H04N 19/44* (2014.11); *H04N 19/11* (2014.11); *H04N 19/17* (2014.11)

(58) Field of Classification Search
CPC ........ H04N 19/44; H04N 19/11; H04N 19/17; H04N 19/159; H04N 19/70; H04N 19/593
See application file for complete search history.

(56) References Cited

U.S. PATENT DOCUMENTS 11,388,421 B1 * 7/2022 Wang ..................... H04N 19/11
2017/0353719 A1 * 12/2017 Liu ..................... H04N 19/156
(Continued)

FOREIGN PATENT DOCUMENTS

CN 113767633 A 12/2021
EP 3962080 A1 3/2022
WO WO-2018054269 A1 * 3/2018 ............. H04N 19/11

OTHER PUBLICATIONS

PCT/CN2023/079416 International Search Report and Written Opinion dated May 18, 2023, 7 pages.
(Continued)

*Primary Examiner* — Richard A Hansell, Jr.
(74) *Attorney, Agent, or Firm* — Cozen O'Connor

(57) ABSTRACT

A method of deriving a Decoder-side Intra Mode Derivation, DIMD, predictor for respective samples of a coding unit, CU, of a picture includes selecting one or more Intra Prediction Modes, IPMs, in a template area adjacent to the CU, determining blending weights for blending at least the one or more selected IPMs, and generating the DIMD predictor by blending the one or more selected IPMs using the determined blending weights for the CU so that the blending varies over the CU.

18 Claims, 22 Drawing Sheets

(56) References Cited

U.S. PATENT DOCUMENTS

| | | | | |
|---|---|---|---|---|
| 2017/0353730 | A1* | 12/2017 | Liu | H04N 19/159 |
| 2019/0373252 | A1* | 12/2019 | Moon | H04N 19/117 |
| 2021/0021847 | A1* | 1/2021 | Moon | H04N 19/46 |
| 2022/0021874 | A1* | 1/2022 | Fang | H04N 19/176 |
| 2022/0394269 | A1* | 12/2022 | Cao | H04N 19/105 |
| 2024/0187569 | A1* | 6/2024 | Wang | H04N 19/70 |
| 2024/0223757 | A1* | 7/2024 | Wang | H04N 19/11 |
| 2024/0236309 | A1* | 7/2024 | Wang | H04N 19/11 |
| 2025/0047867 | A1* | 2/2025 | Naser | H04N 19/593 |
| 2025/0310519 | A1* | 10/2025 | Chiang | H04N 19/196 |
| 2025/0343904 | A1* | 11/2025 | Ma | H04N 19/159 |

OTHER PUBLICATIONS

European Patent Application No. 22167216.5 Search and Opinion dated Sep. 15, 2022, 11 pages.

* cited by examiner (a)

METHOD AND APPARATUS FOR DIMD REGION-WISE ADAPTIVE BLENDING, AND ENCODER/DECODER INCLUDING THE SAME

CROSS-REFERENCE TO RELATED APPLICATIONS

This application is a U.S. National Stage Application of International Application No. PCT/CN2023/079416, filed Mar. 2, 2023, which is based on and claims priority to the European Patent Application No. 22167216.5, filed on Apr. 7, 2022, the entire content of each of the above-referenced applications is incorporated herein by reference.

TECHNICAL FIELD

The present disclosure generally relates to the field of encoding/decoding pictures, images or videos, and embodiments of the present disclosure concern improvements regarding the Intra prediction, more specifically, improvements regarding a decoder-side intra mode derivation, DIMD, process. More specific embodiments of the present disclosure relate to a DIMD region-wise adaptive blending.

BACKGROUND

The encoding and decoding of a picture, an image or a video is performed in accordance with a certain standard, for example, in accordance with the advanced video coding, AVC standard, the high efficiency video coding, HEVC, standard or the versatile video coding, VVC, standard.

A block diagram of a standard video compression system 100 operating in accordance with the VVC standard is illustrated in FIG. 1. The standard video coder 100 compresses and encodes a picture 102 of a video sequence. The picture 102 to be encoded is partitioned into blocks 104 also referred to as coding units, CUs. The encoder 100 comprises a pre-encode filter 106 and a prediction residual signal former 108 which generates a prediction residual signal 110 so as to measure a deviation of a prediction signal 112 from the signal 114 output by the filter 106. The encoder further comprises a transformer 116, a quantizer 118 and provides an output bitstream or data stream 120 using an entropy coder 122. Further, the encoder 100 comprises a prediction stage 124 for determining the prediction signal 112, which includes a de-quantizer or inverse quantizer 126, an inverse transformer 128, a combiner 130, an in-loop filter 134, a motion estimator 138, an intra/inter mode selector 140, an inter predictor 142 and an intra predictor 144.

The video coder 100 as described with reference to FIG. 1 compresses and encodes a picture 102 of a video sequence as follows. The picture 102 to be encoded is partitioned into the blocks or CUs 104. Each coding unit 104 is encoded using either an intra or inter coding mode. When a CU is encoded in the intra mode, intra prediction is performed by the intra predictor 144. The intra prediction comprises predicting the current CU 114 being encoded by means of already coded, decoded and reconstructed picture samples located around the current CU, e.g., on the top and on the left of the current CU. The intra prediction is performed in the spatial domain. In an inter mode, motion compensation and motion estimation are performed by the motion estimator 138 which searches, in one or more reference pictures provided by the picture buffer 136 and used to predictively code the current picture, a CU that is a good predictor of a current CU. For example, a good predictor of a current CU is a predictor which is similar to the current CU, i.e., the distortion between the two CUs is low or below a certain threshold. The motion estimation may also account for the rate cost of signaling the predictor to optimize a rate-distortion tradeoff. The output of the motion estimation step is one or more motion vectors and reference indices associated with the current CU. The motion compensation then predicts the current CU by means of the one or more motion vectors and reference pictures indices as determined by the motion estimator 138. Basically, the block or CU contained in the selected reference picture and pointed to by the determined motion vector is used as the prediction block for the current CU. The encoder 100, by means of the selector 140, selects one of the intra coding mode or the inter coding mode to use for encoding the CU and indicates the intra/inter decision, for example, by means of a prediction mode flag. Prediction residuals 110 are then transformed and quantized by blocks 116 and 118, and the quantized transform coefficients as well as the motion vectors and other syntax elements are entropy encoded and written into the output bitstream 120. The encoder 100 may skip the transform stage 116 and apply the quantization directly to the non-transformed residual signal 110 in a so-called transform-skip coding mode. After a block or CU has been encoded, the encoder decodes the CU and reconstructs it so as to obtain the reconstructed signal 132 that may serve as a reference data for predicting future CUs or blocks to encode. The quantized transform coefficients 110' are de-quantized and inverse transformed leading to a decoded prediction CU or block 110", and the decoded prediction residuals and the predicted block are then combined at 130, typically summed, so as to provide the reconstructed block or CU 132. The in-loop filters 134 are applied to the reconstructed picture to reduce compensation artifacts. For example, a deblocking filter, a sample adaptive offset, SAO, filter, and an adaptive loop filter, ALF, may be applied to reduce encoding artifacts. The filtered picture is stored in the buffer 136, also referred to as the decoded picture buffer, DPB, so that it may be used as a reference picture for coding subsequent pictures.

FIG. 2 is a block diagram of a video decoder 150 for predictively decoding from a data stream 152 a picture or video which is provided at an output 154 of the decoder 150. The decoder 150 includes an entropy decoder 156, a partitioning block 158, an inverse quantizer 160, an inverse transformer 162, a combiner 164, an in-loop filter 166, optionally a post-decoding processor 168, and a prediction module 170. The prediction module 170 includes a decoded picture buffer 180 a motion compensator 182 an intra predictor 184.

An encoded picture of a video sequence is decompressed and decoded by the decoder 150 as follows. The input bit stream 152 is entropy decoded by the decoder 156 which provides, for example, the block partitioning information, the coding mode for each coding unit, the transform coefficients contained in each transform block, prediction information, like intra prediction mode, motion vectors, reference picture indices, and other coding information. The block partitioning information indicates how the picture is partitioned and the decoder 150 may divide the input picture into coding tree units, CTUs, typically of a size of 64×64 or 128×128 pixels and divide each CTU into rectangular or square coding units, CUs, according to the decoded partitioning information. The entropy decoded quantized coefficients 172 are de-quantized 160 and inverse transformed 162 so as to obtain the decoded residual picture or CU 174. The decoded prediction parameters are used to predict the current block or CU, i.e., whether the predicted block is to be obtained through its intra prediction or through its motion-compensated temporal prediction. The prediction process performed at the decoder side is the same as the one performed at the encoder side. The decoded residual blocks 174 are added to the predicted block 176, thereby yielding the reconstructed current image block 164. The in-loop filters 166 are applied to the reconstructed picture or image which is also stored in the decoded picture buffer 180 to serve with the reference picture for future pictures to decode. As mentioned above, the decoded picture may further go through a post-decoding processing, for example for performing an inverse color transformation, for example a conversion from YCbCr 4:2:0 to RGB 4:4:4.

As mentioned above, the intra prediction mode to be employed for decoding may be carried in the bit stream provided by the encoder and received by the decoder, however, in accordance with other approaches, rather than introducing the actual intra prediction mode into the bit stream, the intra prediction mode may also be derived by using a gradient analysis of reconstructed pixels neighboring a currently processed CU. In other words, the intra prediction mode is not explicitly indicated in the bit stream but is implicit. This approach is referred to as decoder-side intra mode derivation, DIMD, which may be signaled using a simple flag, and the actual intra mode is then derived during the reconstruction process, like the reconstruction process performed by the prediction block 124/170 of the encoder 100 or the decoder 150. The encoder 100 may encode into the bit stream 120 information whether DIMD is used or not for the current CU, and in case DIMD is not used, the actual intra mode is signaled by the encoder and parsed from the bit stream by the decoder.

FIG. 3 illustrates an example of an intra block general reconstruction process as it may be applied at the encoder 100 or at the decoder 150. During a parsing process 200, an intra block decoding is determined, as indicated at block 202, and a pixel residual parsing 204 as well as a DIMD flag parsing 206 is performed. In case the DMID flag 206 is zero, an intra prediction mode parsing 208 is performed so as to obtain the intra mode 210 to be used during the reconstruction process 212 when predicting and reconstructing a pixel, as is indicated at 216. In case the DIMD flag 206 is set to one, the intra prediction derivation 218 is performed during the reconstruction process 212 which yields the derived intra mode 220 which is used, together with the pixel residuals 214 at 216, for the reconstruction process.

Further details of the DIMD approach are described in references [5] to [8]. Conventionally, the DIMD process is based on a reconstructed template area adjacent to a currently processed CU which is three samples wide in width and height. The template area comprises a left area, an above area and an above-left area. These areas are also referred to in the following as a left template area region, an above template area region and an above-left template area region. In the template area respective edge detection filters, like 3×3 horizontal and vertical Sobel filters, are applied in order to determine the amplitude and angle of luminance directions or orientations for each middle line sample of the template area. A Histogram of Gradients, HoG, is computed, and each entry corresponds to a conventional intra angular mode and the cumulated intensities are stored:

$$\text{angle} = \arctan\left(G_{hor}/G_{ver}\right)$$

-continued $$\text{amplitude} = |G_{hor}| + |G_{ver}|$$

with $G_{hor}$ and $G_{ver}$ being the intensity of pure horizontal and vertical directions as calculated by the Sobel filters. FIG. 4 illustrates the DIMD template area or zone used for computing the HoG. FIG. 4(*a*) illustrates a partially reconstructed picture 250 as indicated by the reconstructed area 252 and the unavailable area 254. In other words, a reconstructed area 252 includes already reconstructed coding units or blocks of the picture to be reconstructed, while the respective coding units or blocks in the unavailable area 254 are still to be reconstructed. A currently processed CU or block 256 is illustrated as well as the above mentioned template area 258. FIG. 4(*b*) illustrates that the template area 258 is 3 samples or pixels wide in width and height, and that a 3×3 horizontal and vertical Sobel filter 259 is used, as described above, to compute the HoG 260 so as to obtain on the basis of the amplitude and angle of luminance directions for each middle line sample 262 of the template area 258 an intra angular prediction mode, also referred to as intra prediction mode, IPM, and for each IPM in the template area an associated cumulated intensity or amplitude. The two most represented IPMs, indicated as $M_1$ and $M_2$ in FIG. 4(*b*), are selected from the HoG 260 and are combined with a Planar mode using weights for $M_1$ and $M_2$ derived from a ratio of their cumulated amplitudes, and a fixed weight for the Planar mode, for example ⅓, i.e., 21/64 with a 6 bit integer precision.

FIG. 5 illustrates the prediction fusion by weighted averaging of $M_1$, $M_2$ and a Planar mode. Assuming a square shaped CU 256, the respective pixels of the CU 256 are predicted by the two most represented IPMs $M_1$, $M_2$ taken from the HoG 260, thereby obtaining the predictor blocks $Pred_1$, $Pred_2$ and $Pred_3$. The respective predictor blocks are weighted by weights $w_1$, $w_2$, $w_3$, and are fused or combined into the final predictor block including the DMID predictor for the respective samples or pixels in the CU 256.

FIG. 6 illustrates an example of a conventional DIMD predictor derivation process. At S100, using an input CU 256, the neighborhood of the input CU 256 is analyzed so as to determine a number of available intra above and intra left samples. At S102, the HoG 260 is built for the template area 258, i.e., on the basis of the available intra samples angular prediction modes, IPMs, are determined (step S104) by their cumulated amplitude in the HoG 260 (step S104). At S106 it is determined how many IPMs are selected, i.e., whether no IPM has been selected, whether one IPM has been selected or whether two IPMs have been selected. In case no IPM has been selected, only the Planar mode, which may be the default mode, is applied, as is indicated at S108, so as to obtain the DIMD predictor. In case only one IPM is selected, the selected IPM is used to obtain the DIMD predictor, as is indicated at S110. In case two IPMs are selected, at S112 the blending weight for each selected mode is determined according to their cumulated amplitude ratio, and the weight for the Planar mode is set to ⅓. At S114 the predictor blocks $Pred_1$, to $Pred_3$ for each selected IPM and the Planar mode are calculated and at S116 the DIMD predictor is obtained by blending the two selected IPMs and the Planar mode using the determined bending weights.

FIG. 7 illustrates an example of a currently processed CU 256 and the associated template area 258 having a width/height of T=3 samples or pixels. For each middle line sample 262 a respective orientation is illustrated by the direction of the respective arrow, and a respective intensity of the gradient is indicated by the length of the arrow. The HoG is generated by cumulating intensities for each orientation/IPM entry, and the two most important modes, in case they exist, in the HoG are selected as modes to be blended with the Planar mode or planar intra prediction mode. In the example of FIG. 7, IPMs 5 and 28 have the first and second highest cumulated intensities/amplitudes. These modes are weighted, as described above, and the blending weights, conventionally, are fixed and/or determined according to the ratio of cumulated intensities/amplitudes of the selected IPMs. Although different blending patterns are proposed in the prior art, all blending patterns are global with regard to the currently processed block or CU. More specifically, when considering conventional approaches and when selecting two IPMs, like $M_1$ and $M_2$, the blending weights may be computed as follows $$w_1 = \frac{43}{64} \times \frac{ampl(M_1)}{ampl(M_1) + ample(M_2)}$$

$$w_2 = \frac{43}{64} \times \frac{ample(M_2)}{ampl(M_1) + ample(M_2)}$$

$$w_3 = \frac{21}{64}$$

with $w_1$ associated with IPM $M_1$, $w_2$ associated with IPM $M_2$, and $w_3$ associated to the Planar mode. Different modifications of the bending process are described in the prior art, for example, selecting multiple blending modes based on a rate distortion optimization, deriving implicitly two out of three blending modes using the HoG, implicitly deriving blending modes using template matching, and different blending modes according to a number of determined DIMD modes. When DIMD is applied, one or two IPMs are derived from the reconstructed neighboring samples, i.e., from the template area, and in case two intra modes are derived, they are combined, i.e., blended, with the Planar mode predictor, conventional solutions always implement a global or CU-level weighted mixing of the two IPMs with Planar mode.

Conventionally, in the reconstructed part 252 of the picture 250 three columns and lines of reconstructed samples or pixels are used for the DIMD process, i.e., filters having fixed filtering windows of 3×3 samples and being located at the same position in the template area 258 are used to compute the HoG 260. A 3×3 Sobel filter 259 may be replaced by 3×2 filter when computing a gradient on a pixel located in the left column, top row or top-left sample and directly neighboring the current CU. Instead of using a 3×3 Sobel filter 259 on all pixels or samples in the middle line of the template area 258, the 3×3 Sobel filter 259 may be applied more sparsely, e.g., only at one middle line sample in the left template area and at one middle line sample in the above template area. Further aspects of the DIMD process are known, such as dealing with the blending of the modes, dealing with behavior correction (bug fixes) with regards to an original intent, dealing with a combination with other modes, and dealing with syntax or simplifications for the DIMD process. However, the basic DIMD process described above with reference to FIG. 6 remained the same.

The conventional blending process for obtaining a final intra predicted block is disadvantageous as it uses weights that apply globally for the entire block or CU, which is currently processed, so that the weights do not account for local characteristics of the IPM, such as an orientation and intensity of the IPMs in the reconstructed template area which results in a less faithful intra predictor. A further disadvantage is that in case only one IPM is selected, the predictor is not combined with a Planar mode or DC mode predictor, i.e., it is the same as in a conventional intra prediction mode. Nevertheless, this mode is coded as a DIMD mode so that when compared to the conventional intra prediction mode, an additional computational overhead is generated as it is required to calculate the HoG which, eventually, may yield only a single IPM to be used.

Thus, there is a need to provide further improvements for the DIMD process.

SUMMARY

The present disclosure provides a method of deriving a Decoder-side Intra Mode Derivation, DIMD, predictor for respective samples of a coding unit, CU, of a picture, the method comprising:

- selecting one or more Intra Prediction Modes, IPMs, in a template area adjacent to the CU,
- determining blending weights for blending at least the one or more selected IPMs, and
- generating the DIMD predictor by blending the one or more selected IPMs using the determined blending weights for the CU so that the blending varies over the CU.

The present disclosure provides a non-transitory computer-readable storage medium comprising instructions which, when executed by a computer, cause the computer to carry out the inventive method.

The present invention provides an apparatus for deriving a Decoder-side Intra Mode Derivation, DIMD, predictor for respective samples of a coding unit, CU, of a picture, the apparatus comprising: a memory for storing instructions; and a processor. The processor is configured to perform the method described above.

It is to be understood that the content described in this section is not intended to identify key or critical features of the embodiment of the present disclosure, nor is it intended to limit the scope of the present disclosure. Other features of the present disclosure become readily apparent from the following description.

BRIEF DESCRIPTION OF THE DRAWINGS

The drawings are explanatory and serve to explain the present disclosure, and are not to be construed to limit the present disclosure to the illustrated embodiments.

DETAILED DESCRIPTION

Figure 1:
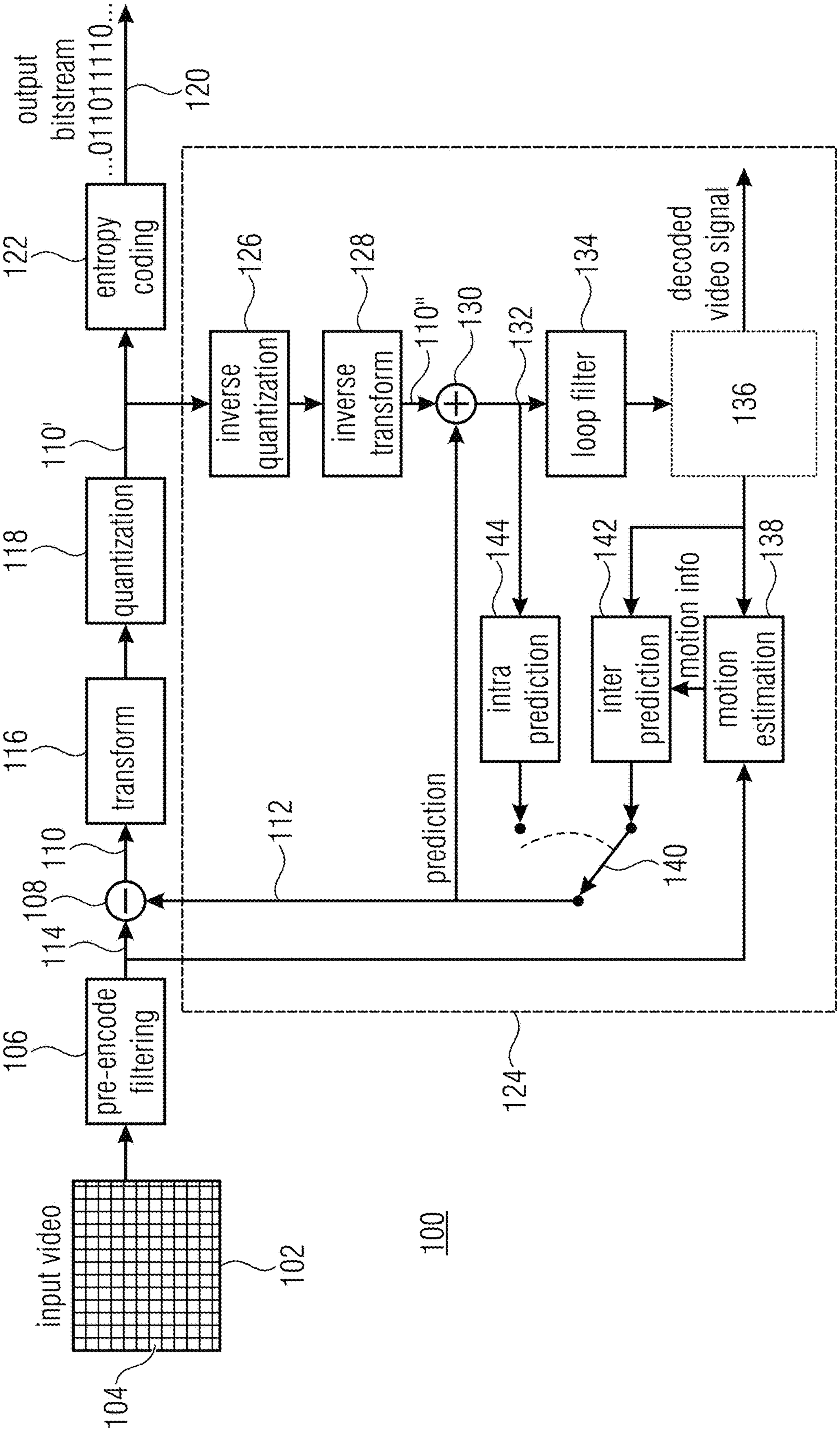
Fig. 1 (prior art)
FIG. 1 is a block diagram of a conventional video encoder.
Figure 2:
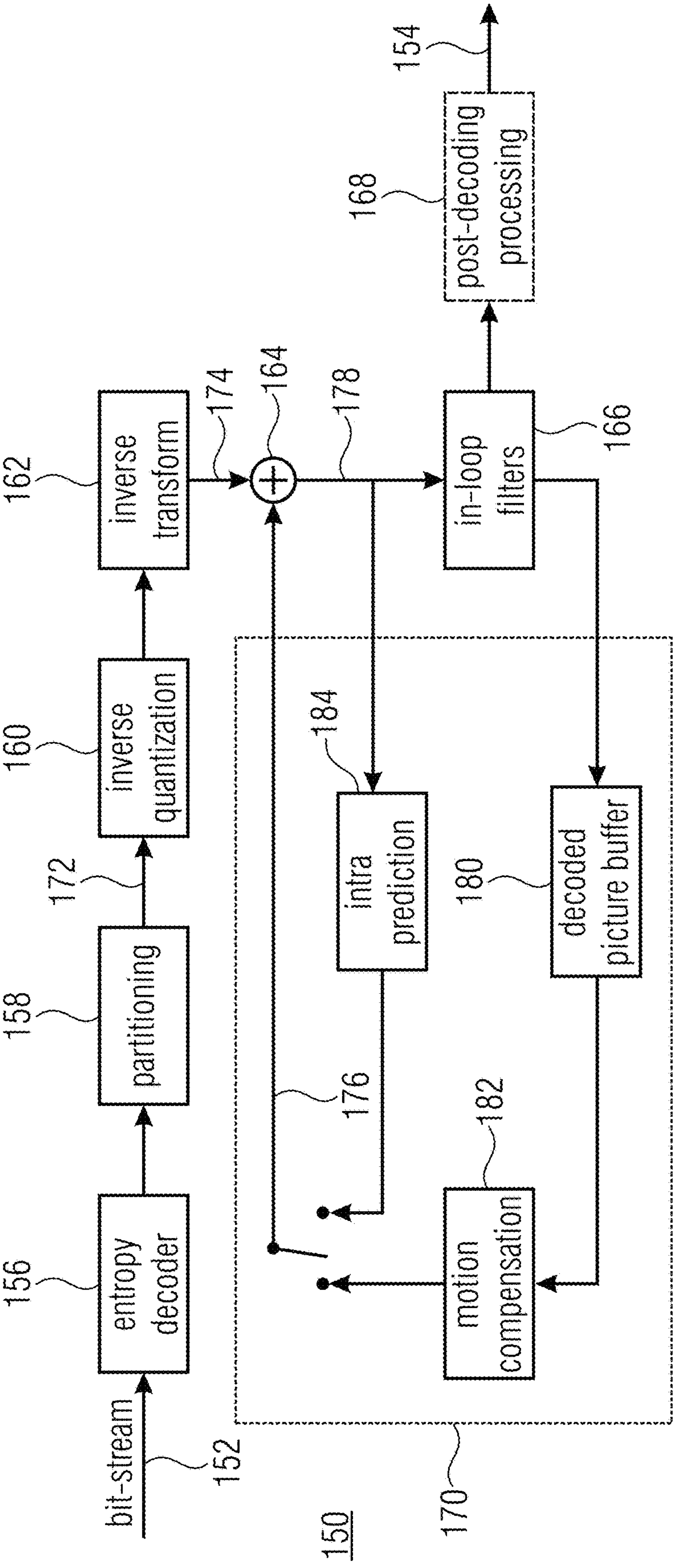
Fig. 2 (prior art)
FIG. 2 is a block diagram of a conventional video decoder.
Figure 3:
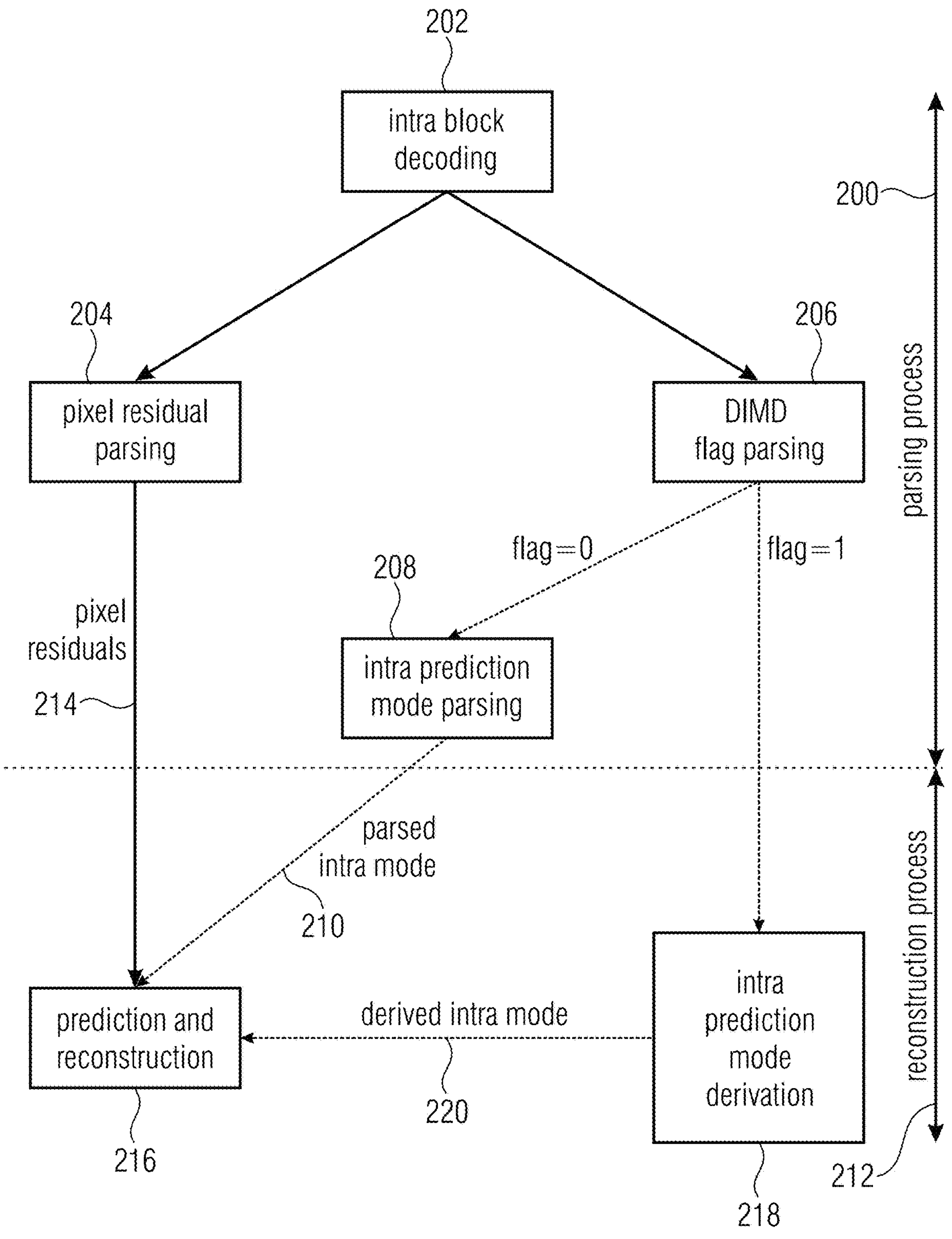
Fig. 3 (prior art)
FIG. 3 illustrates an example of an intra block general reconstruction process as it may be applied at the encoder of FIG. 1 or at the decoder of FIG. 2.
Figure 4:
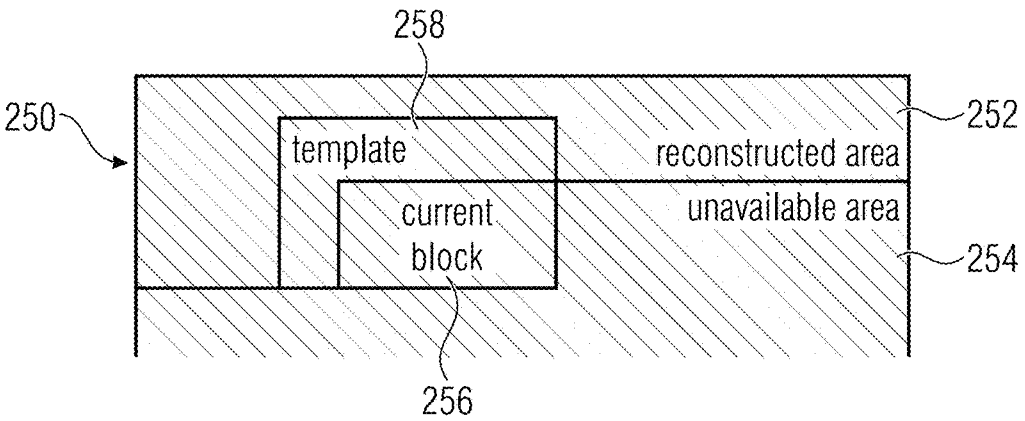
Fig. 4 (prior art)
FIG. 4 illustrates a DIMD template area or zone used for computing a Histogram of Gradients, HoG, in the DIMD process.
Figure 4:
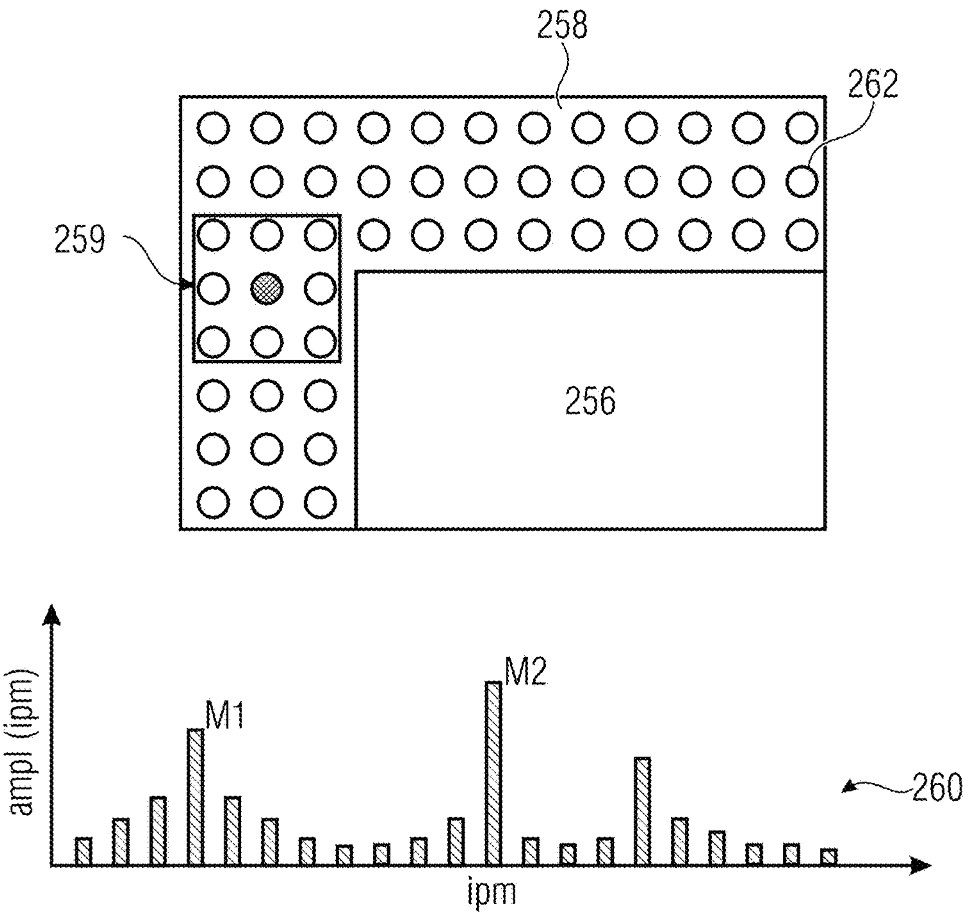
Fig. 4 (prior art)
Figure 5:
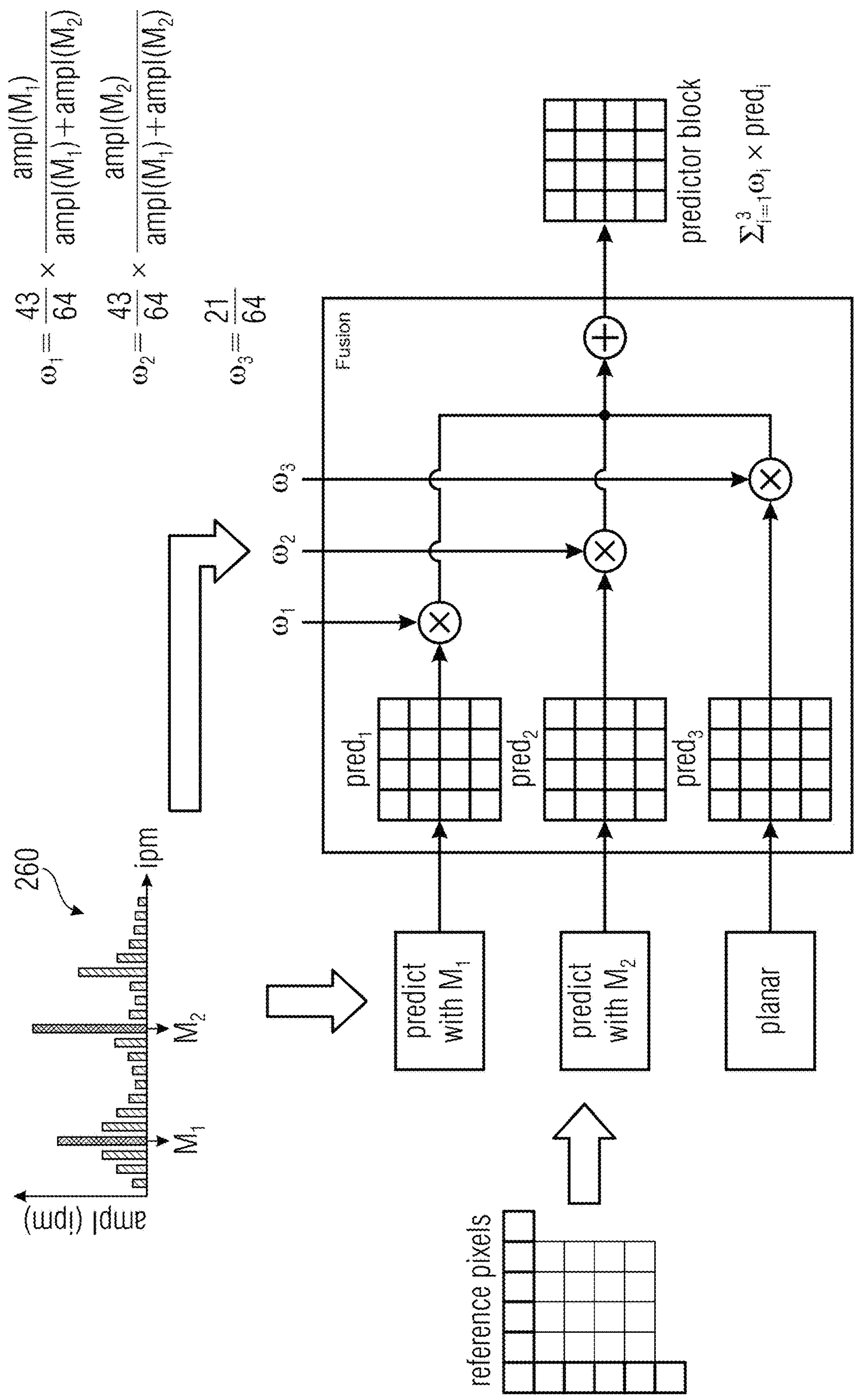
Fig. 5 (prior art)
FIG. 5 illustrates the prediction fusion by weighted averaging of selected IPMs and a Planar mode.

Illustrative embodiments of the present disclosure are described below with reference to the drawings, where various details of the embodiments of the present disclosure are included to facilitate understanding and should be considered as illustrative only. Accordingly, those of ordinary skill in the art will recognize that various changes and modifications of the embodiments described herein can be made without departing from the scope of the present disclosure. Also, descriptions of well-known functions and constructions are omitted from the following description for clarity and conciseness.

In the present disclosure, the term "and/or" is intended to cover all possible combinations and sub-combinations of the listed elements, including any one of the listed elements alone, any sub-combination, or all of the elements, and without necessarily excluding additional elements.

In the present disclosure, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present disclosure, the term "coding" refers to "encoding" or to "decoding" as becomes apparent from the context of the described embodiments. Likewise, the term "coder" refers to "an encoder" or to "a decoder".

The present disclosure provides a method of deriving a Decoder-side Intra Mode Derivation, DIMD, predictor for respective samples of a coding unit, CU, of a picture, the method comprising:

selecting one or more Intra Prediction Modes, IPMs, in a template area adjacent to the CU, determining blending weights for blending at least the one or more selected IPMs, and generating the DIMD predictor by blending the one or more selected IPMs using the determined blending weights for the CU so that the blending varies over the CU.

In some embodiments, the method comprises:

splitting the CU into two or more CU regions, wherein the blending weights are determined, for each out of at least a subset of the two or more CU regions, dependent on the presence of the one or more selected IPMs in a part of the template area that is adjacent to the respective CU region, and wherein the DIMD predictor is generated using the determined blending weights determined for each CU region.

In some embodiments, the one or more IPMs are selected using IPM statistics, like a Histogram of Gradients, HoG, determined globally over the entire template area, the template area comprising a plurality of template area regions, wherein the selection is performed globally for the entire CU, or the selection involves a global selection of a set of IPMs for the entire CU, followed by a further region-wise selection out of the set of IPMs for each CU region.

In some embodiments, the one or more IPMs are selected using IPM statistics, like a Histogram of Gradients, HoG, determined separately over each of a plurality of template area regions of the template area, the plurality of template area regions including a left template area region and an above template area region, or each of a plurality of partial template area regions of the template area, a partial template area region being a template area region adjacent only to one of the CU regions, and wherein the selection involves a region-wise selection out of the separately determined IPMs for each CU region.

In some embodiments, determining the blending weights comprises for a CU region located adjacent to the template area, determining the blending weights dependent on a presence of the one or more selected IPMs in one or more template area regions or partial template area regions adjacent to the CU region, and for a CU region located not adjacent to the template area, selecting only the Planar mode as the DIMD predictor, or selecting only the DC mode as the DIMD predictor, or determining the blending weights using the one or more selected IPMs in one or more or all template area regions, or determining the blending weights by weighting blending weights of a CU region adjacent to a template area region.

In some embodiments, the one or more IPMs are selected in a manner aware of a subdivision of the template area into a plurality of template area regions, the plurality of template area regions including a left template area region and an above template area region, the template area further includes an above-left template area region, the above-left template area region being allocated to the above template area region, or to the left template area region, or to both the above template area region and the left template area region, or as an additional template area region, and/or the one or more IPMs are selected in a manner aware of a subdivision of the template area into a plurality of partial template area regions, the partial template area regions are defined by splitting the template area with the same vertical and/or horizontal lines as the CU when defining the two or more CU regions.

In some embodiments, one or more first IPMs are selected in a template area region of the template area, and one or more second IPMs are selected in a partial template area region of the template area, and wherein if the CU has a rectangular shape, the first IPM is selected in the template area region adjacent to the longer size of the CU, and the second IPM is selected in the partial template area region adjacent to the shorter size of the CU, or selecting the first IPM and the second IPM in the template area region or from the partial template area region adjacent to the CU depends on a direction of a peak IPM in the template area region or in the entire template area, e.g., if a main direction of the peak IPM computed in the template area region or in the entire template area is more vertical than horizontal, the first IPM is selected in the left or above template area region and, optionally, in the above-left template area region adjacent to the CU region, and the second IPM is selected in the partial above or left template area region adjacent to the CU region, and if a main direction of the peak IPM computed in the template area region or in the entire template is more horizontal than vertical, the first IPM is selected in the above or left template area region, and, optionally, in the above-left template area region adjacent to the CU region, and the second IPM is selected in the partial left or above template area region adjacent to the CU region.

In some embodiments, in case two or more IPMs are selected, at least some but not all of the IPMs are selected in the entire template area and the remaining IPMs are selected in a template area region or from a partial template area region adjacent to the CU region, or in case two IPMs are selected, a first IPM in the entire template area is selected and if there is no second IPM from the template area region or the partial template area region adjacent to the CU region, the first IPM is used as the DIMD predictor, or the first IPM is blended with a Planar or DC mode using a predefined weight to obtain the DIMD predictor, if there is a second IPM selected in the template area region or the partial template area region adjacent to the CU region if the second IPM is different from the first IPM, blend the first IPM and the second IPM to obtain the DIMD predictor, if the second IPM is equal to the first IPM, select a further IPM in the template area region adjacent to the CU region and blend the first IPM and the further IPM to obtain the DIMD predictor.

In some embodiments, for a CU region located not adjacent to any of the template area regions, only the first IPM is used as the DIMD predictor, or only the Planar mode is used as the DIMD predictor, or only the DC mode is used as the DIMD predictor, or the first IPM is blended with the Planar or DC mode using a predefined weight to obtain the DIMD predictor.

In some embodiments, in case more than one IPM is selected if the IPMs are present in the template area region adjacent to a CU region, the blending weights associated with the IPMs are used, if only one of the IPMs is present in a template area region adjacent to a CU region, the blending weight associated with the one IPM or a weighted blending weight associated with the one IPM is used, and the blending weight associated with any other IPM is set to a predefined value, like 0, optionally, if no IPM is present in the adjacent template area region of the CU region, the blending weights associated with the IPMs are set to a predefined value, like 0, and optionally, a blending weight associated with a Planar or DC mode is set to a predefined value, or in case one IPM is selected if the one IPM is present in a template area region adjacent to a CU region, the blending weight associated with the one IPM or a weighted blending weight associated with the one IPM is used, and the blending weight associated with any other IPM is set to a predefined value, like 0, optionally, if the one IPM is not present in a template area region adjacent to a CU region, the blending weight associated with the one IPM and the blending weight associated with any other IPM is set to a predefined value, like 0, and optionally, a blending weight associated with a Planar or DC mode is set to a predefined value, or in case no IPM is selected the blending weight associated with any other IPM is set to a predefined value, like 0, and, optionally, a blending weight associated with a Planar or DC mode is set to a predefined value.

In some embodiments, for a CU region, which is located adjacent to a first template area region for which no IPM is selected and which is distant from a second template area region for which one or more IPMs are selected, the blending weights are weighted blending weights of the CU region adjacent to the second template area region, or for a CU region, which is located adjacent to a first template area region for which a first IPM is selected and which is distant from a second template area region for which a second IPM is selected, the blending weights for the second IPM is a weighted blending weight for the second IPM of the CU region adjacent to the second template area region.

The present disclosure provides a non-transitory computer-readable storage medium comprising instructions which, when executed by a computer, cause the computer to carry out the inventive method.

The present invention provides an apparatus for deriving a Decoder-side Intra Mode Derivation, DIMD, predictor for respective samples of a coding unit, CU, of a picture, the apparatus comprising: a memory for storing instructions; and a processor. The processor is configured to perform the method described above.

The present disclosure provides an apparatus for deriving a Decoder-side Intra Mode Derivation, DIMD, predictor for respective samples of a coding unit, CU, of a picture, the apparatus comprising:

an Intra Prediction Mode, IPM, selection module configured to select one or more IPMs in a template area adjacent to the CU, a blending weight determination module configured to determine blending weights for blending at least the one or more selected IPMs, and a DIMD predictor generation module configured to generate the DIMD predictor by blending the one or more selected IPMs using the determined blending weights for the CU so that the blending varies over the CU.

The present disclosure provides an apparatus for decoding an encoded data stream, the encoded data stream including data representing a picture, the apparatus comprising:

a decoder module configured to decode from the encoded data stream the picture, and a prediction module, the prediction module including an inventive apparatus for deriving a Decoder-side Intra Mode Derivation, DIMD, predictor for respective samples of a coding unit, CU, of the picture.

The present disclosure provides an apparatus for encoding a picture into an encoded data stream, the encoded data stream including data representing the picture, the apparatus comprising:

an encoder module configured to receive the original picture and to encode the picture into the encoded data stream, and a prediction module, the prediction module including an inventive apparatus for deriving a Decoder-side Intra Mode Derivation, DIMD, predictor for respective samples of a coding unit, CU, of the picture.

The technical solutions provided according to embodiments of the present disclosure have the following beneficial effects.

In prior art approaches, the blending weights are selected for the entire CU currently processed or predicted, i.e., conventional approaches focus on a global or CU level approach when determining the blending weights for the selected IPMs. However, the signal characteristics of the IPMs may differ across the template area so that the selected weights may be more suitable for obtaining the DIMD predictor for samples in one CU region than for obtaining the DIMD predictor for samples in another CU region. In other words, the weights may not account for local characteristics of the IPMs, such as an orientation and intensity of the IPMs in the reconstructed template area, which results in a less faithful intra predictor.

The present disclosure addresses the above drawbacks by no longer using a fixed blending over the CU, but providing for a blending of the one or more selected IPMs using the determined blending weights for the CU in such a way that the blending varies over the CU. Thereby, the blending process generates an intra predictor fitting more faithfully to the local orientations of the CU to be predicted, thereby improving the prediction accuracy.

In accordance with embodiments of the present disclosure, the blending weights are selected region-wise based on an adjacency of a region of a currently processed CU to the template area, like respective template areas or template area regions. The overall template area is used to determine the IPMs from the IPM statistics, like the HoG, and a region-wise map of weights may be generated for the CU to be predicted as an outcome of the process according to embodiments of the present disclosure. The map may be used during the blending process to generate an intra predictor fitting more faithfully to the local orientations of the CU to be predicted, thereby improving the prediction accuracy. Embodiments provide for the improved prediction accuracy by leveraging the prior art HoG so that besides only a few additional computational operations for implementing the selection of the region-wise blending weights, no substantial changes of the exiting DIMD process are required so that the inventive approach may be easily incorporated into the existing DIMD process.

A further disadvantage of conventional approaches is that in case only one IPM is selected, the predictor is not combined with a Planar mode or DC mode predictor, i.e., it is the same as in a conventional intra prediction mode. Nevertheless, this mode is coded as a DIMD mode so that when compared to the conventional intra prediction mode, an additional overhead is generated as it is required to calculate the HoG which, eventually, may yield only a single IPM to be used. The present disclosure is advantageous because, in accordance with embodiments, the region-wise blending weights are also used when deriving only one IPM by combining the only one IPM and the Planar or DC mode using the region-wise blending weight determined for the one selected IPM thereby also taking advantage of the DIMD mode for such a scenario.

Figure 8:
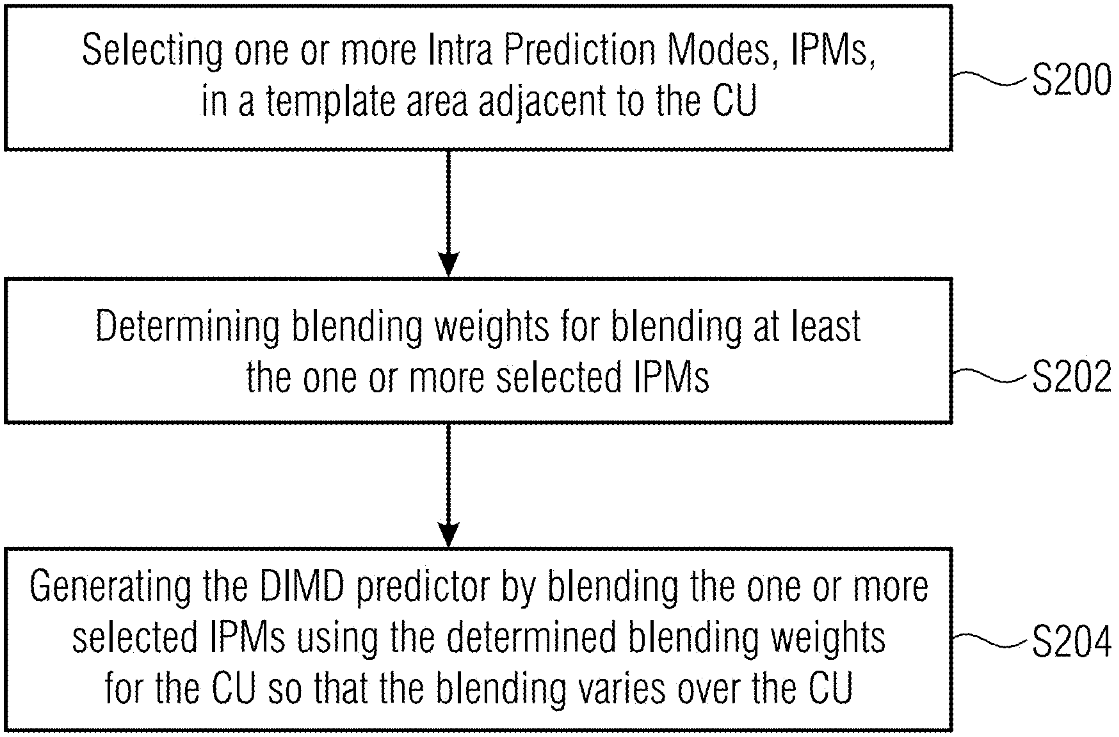
FIG. 8 illustrates a flow diagram of a method of deriving DIMD predictor for respective samples of a CU in accordance with embodiments of the present disclosure.

FIG. 8 illustrates a flow diagram of a method of deriving a Decoder-side Intra Mode Derivation, DIMD, predictor for respective samples of a coding unit, CU, of a picture in accordance with embodiments of the present disclosure. The method includes the following steps:

S200: selecting one or more Intra Prediction Modes, IPMs, in a template area adjacent to the CU.

S202: determining blending weights for blending at least the one or more selected IPMs.

S204: generating the DIMD predictor by blending the one or more selected IPMs using the determined blending weights for the CU so that the blending varies over the CU.

In accordance with embodiments, the blending of the one or more selected IPMs such that the blending varies over the CU is achieved by a region-wise, i.e., of separate regions of the CU, selection of the blending weights. The CU is split into two or more CU regions, and the blending weights are determined, for each out of at least a subset of the two or more CU regions, dependent on the presence of the one or more selected IPMs in a part of the template area that is adjacent to the respective CU region. The DIMD predictor is then generated using the determined blending weights determined for each CU region. In other words, embodiments of the present disclosure provide a method for deriving DIMD predictor for samples of a currently processed CU using CU-region-wise determined blending weights for blending IPM(s)/Planar or DC modes, instead of using weights determined only for the entire CU.

In accordance with embodiments of the present disclosure, the currently processed CU, which is predicted using the DIMD process, is split into rectangular or square CU regions. The CU regions may be of the same size, and may be split horizontally and/or vertically. Thus, the respective CU regions, in accordance with embodiments, may be of rectangular or square shape. It is noted that the blending weights are selected and applied for each region. Regarding the splitting operation, it is noted that the splitting is not related to the CU partitioning, but only defines two or more regions within the CU, and respective blending weights are allocated to such CU regions. The actual CU splitting operation may be performed before the HoG construction or following the HoG construction.

Figure 9:
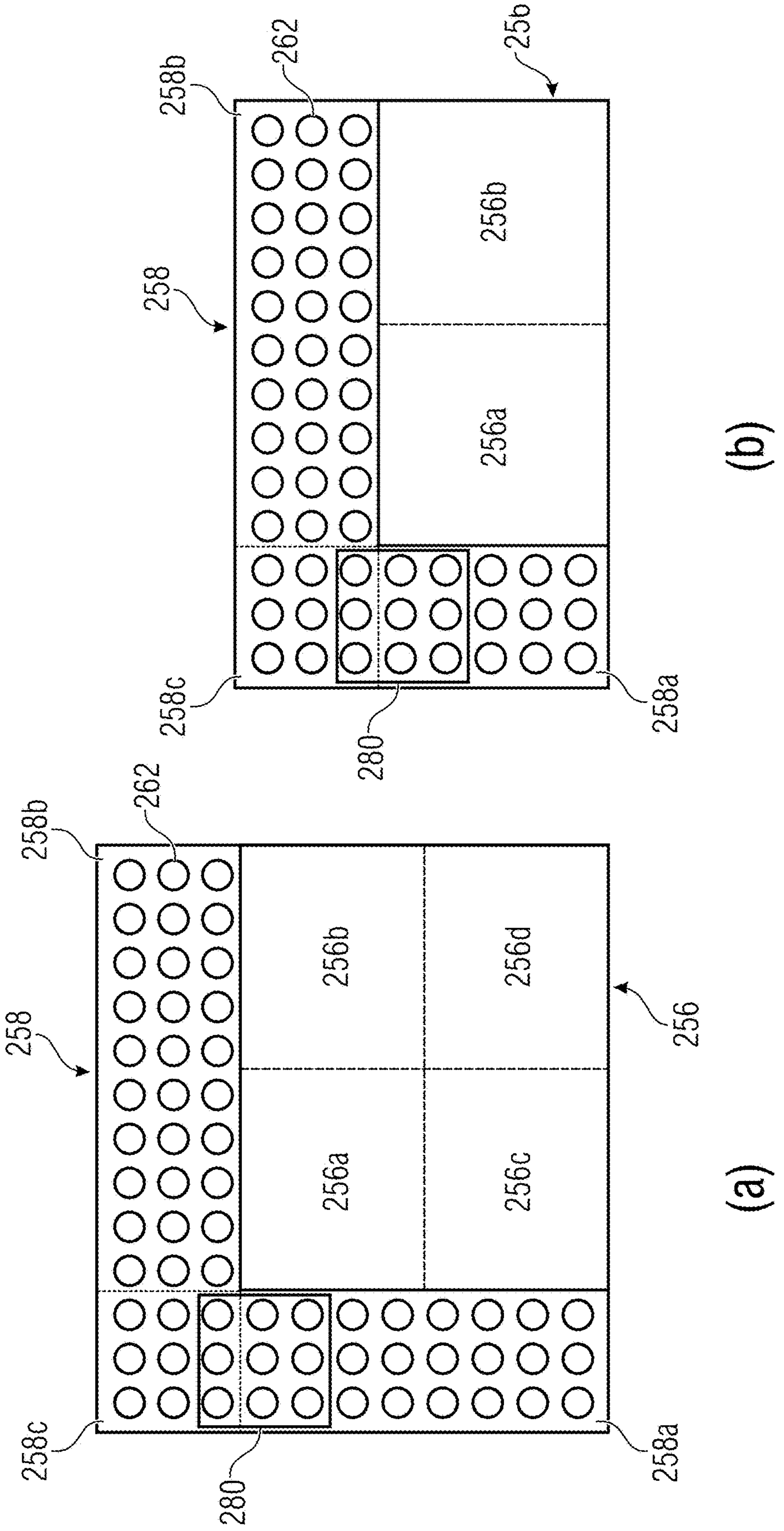
FIG. 9 illustrates the splitting of a current CU into a plurality of CU regions associated with different blending weights in accordance with embodiments of the present disclosure.

FIG. 9 illustrates the splitting of a current CU 256 into a plurality of CU regions associated with different blending weights in accordance with embodiments of the present disclosure. FIG. 9(*a*) illustrates the currently processed CU 256, the template area 258 and the respective samples or pixels in the template area 258 filtered, as in the above-described conventional approaches, using a filter having a 3×3 filtering window 280 centered on a middle line samples 262 of the template area 258. The template area 258 includes a left template area or left template area region 258*a*, an above template area or above template area region 258*b* and an above-left template area or above-left template area region 258*c*. The boundaries between the template area regions are indicated by the dashed lines in the template area 258. The currently processed CU 256 is split into four CU regions or blending weight regions, as is indicated by the dashed line in the CU 256 yielding a first or top-left, TL, CU region 256*a*, a second or top-right, TR, CU region 256*b*, a third or bottom-left, BL, CU region, 256*c* and a fourth or bottom-right, BR, CU region 256*d*. FIG. 9(*b*) illustrates another embodiment of the present disclosure in accordance with which the currently processed CU 256 is split into two CU regions, yielding a first or a left, L, CU region 256*a* and a second or right, R, CU region 256*b*. While in FIG. 9(*a*) the CU 256 is split into the four regions of rectangular shape, in FIG. 9(*b*) the CU 256 is split into two square-shaped CU regions.

Figure 10:
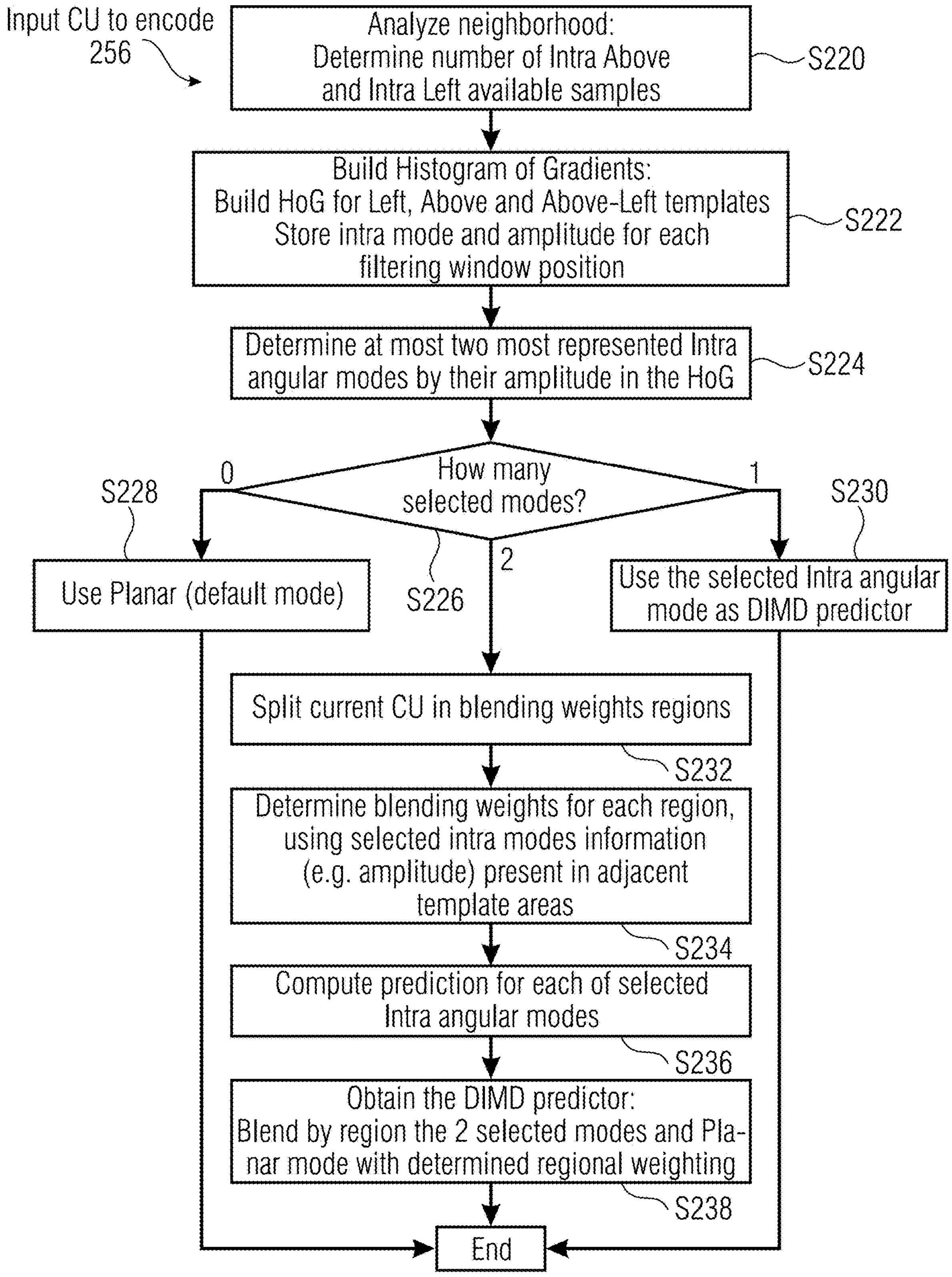
FIG. 10 illustrates a DIMD predictor derivation process in accordance with embodiments of the present disclosure.

As in conventional DIMD processes, a HoG is built for the template area 258, and, in accordance with embodiments of the present disclosure, the IPM associated with each filtering window position is stored. It is noted that the present disclosure is not limited to determining the IPM statistics, on the basis of which the one or more IPMs are selected, on the basis of a HoG. In accordance with other embodiments, other approaches may be applied for determining g the IPM statistics, e.g., a Hough transform or a gradient-based Hough transform may be used on a filtering window size in order to determine directions for each center pixel (of the filtering window) and then a histogram of found directions may allow selecting the peak direction (and the matching IPM). Two or more IPMs are selected from the HoG, as in the prior art approaches, and, eventually, the blending weights are determined for each CU region. FIG. 10 illustrates a DIMD predictor derivation process in accordance with embodiments of the present disclosure. At S220, a neighborhood of a currently processed CU 256 is analyzed so as to determine a number of available intra above and intra left samples or pixels on the basis of which, at S222, the HoG is built. In addition, IPMs and associated amplitudes for each filtering window position are stored. At S224, two or more of the most represented IPMs by the amplitude in the HoG are determined. In the embodiment described with reference to FIG. 10, two of the most represented IMPs are determined, and at S226 it is determined whether 0, 1 or 2 IPMs are selected. In case no IPM is selected, the Planar or DC intra prediction mode, which may be the default mode, is used as the DIMD predictor, as is indicated at S228. In case one IPM is selected, in accordance with embodiments, the selected IPM is used as the DIMD predictor, as is indicated at S230.

In case it is determined at S226 that two IPMs are selected, the CU which is currently processed, is split into a plurality of CU regions or CU blending weight regions, as is indicated at S232. For example, the CU may be split in a way as described above with reference to FIG. 9. At S234, the blending weights for each region are determined, using the cumulated amplitudes of those IPMs which are present in a template area region adjacent to the CU region. At S236, the prediction for each selected IPM is computed, and at S238 the DIMD predictor is obtained by blending, by region, the two selected IPMs and the Planar or DC mode using the determined regional blending weights. In accordance with other embodiments, as mentioned above, step S232 may be performed before the building of the HoG at step S222.

In accordance with yet other embodiments, when selecting only one IPM, respective regional blending weights may be determined, and, rather than using the one selected IPM as the DIMD predictor, the DIMD predictor is obtained by blending the one selected IPM and the Planar mode or DC mode using the determined regional blending weights.

Figure 11:
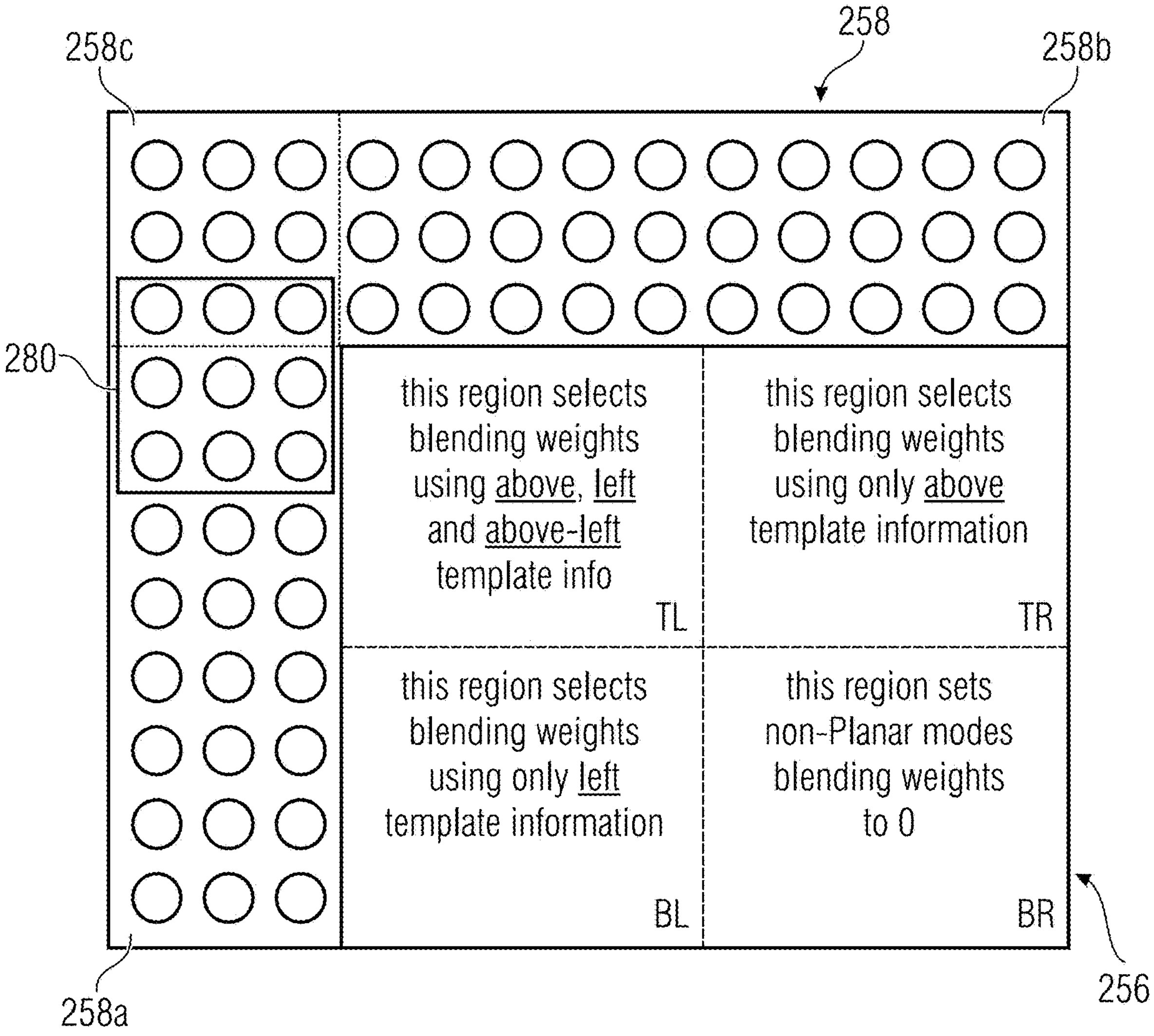
FIG. 11 illustrates the selecting of blending weights according to the adjacency of a certain CU region with respect to a certain template area region, in accordance with embodiments of the present disclosure.

1$^{st}$ Aspect: Regional Blending Weights Derivation Using Weights Computed for the Whole Template Area In accordance with embodiments of a first aspect of the present disclosure, after the HoG is computed, each CU region is attached or associated with at least one adjacent template area, e.g., the above, left and/or left-above template area region. The blending weights for a certain CU region are selected dependent on whether IPMs associated with the globally computed blending weights are present or not in a template area region that is adjacent to the CU region. FIG. 11 illustrates the selection of blending weights according to the adjacency of a certain CU region with respect to a certain template area region, in accordance with embodiments of the present disclosure. As is illustrated, the current CU 256 is split into four square regions, namely the TL region, the TR region, the BL region and the BR region. Naturally, the CU 256 which is currently processed, may be split into rectangular regions as well, and instead of splitting the CU 256 into four regions, it may be split in less regions, as in FIG. 9(*b*) or into more rectangular or square regions.

In accordance with embodiments, splitting the CU 256 may depend on a size of the currently processed CU so that, for example, a CU having a size of 16×8 samples may be split into two regions being of square shape each having a size of 8×8 samples. In accordance with further embodiments, the splitting of the CU 256 may only be applied in case the size of the currently process CU is above a predefined threshold, for example, for CUs having a size of at least 8×8 or 16×8 or 8×16.

In accordance with the embodiment described with reference to FIG. 11, the respective CU regions use the global weight which is associated with the IPM present in the adjacent template area regions. The statistics, like the cumulated amplitude, of the IPM present in the respective template area regions are computed on the entire HoG. In other words, the CU region does not modify the weight computed on global statistics but selects weights according to the presence of the matching IPM in the adjacent template rea regions. For example, for the top-left CU region the blending weights associated with the IPMs present in the above and the left template area regions 258*a*, 258*b*, optionally also in the above-left template 258*c* area, are selected. For the top-right CU region only the blending weights associated with the IPMs present in the above template area region 258*b* are selected. Likewise, for the bottom-left CU region only the blending weights associated with the IPMs present in the left template area region 258*a* are selected. For the bottom-right CU region, which is not adjacent to the template area 258, the weights associated with any mode other than the Planar or DC modes are set to zero, i.e., the Planar mode/DC mode is used as predictor for the bottom-right CU region.

In accordance with embodiments, the region-wise blending weights may be selected as follows:

Initially, the IPMs to be blended are selected using, e.g., the HoG, and in case more than one IPM is selected, the region-wise blending weights may be set according to one or more of the following:

(R1.1) if the IPMs are present in the template area region adjacent to a CU region, the blending weights associated with the IPMs are used, (R1.2) if only one of the IPMs is present in a template area region adjacent to a CU region, the blending weight associated with the one IPM or a weighted blending weight associated with the one IPM is used, and the blending weight associated with any other IPM is set to a predefined value, like 0, (R1.3) if no IPM is present in the adjacent template area region of the CU region, the blending weights associated with the IPMs are set to a predefined value, like 0, (R1.4) a blending weight associated with a Planar or DC mode is set to a predefined value.

In case one IPM is selected, the region-wise blending weights may be set according to one or more of the following:

(R2.1) if the one IPM is present in a template area region adjacent to a CU region, the blending weight associated with the one IPM or a weighted blending weight associated with the one IPM is used, and the blending weight associated with any other IPM is set to a predefined value, like 0, (R2.2) if the one IPM is not present in a template area region adjacent to a CU region, the blending weight associated with the one IPM and the blending weight associated with any other IPM is set to a predefined value, like 0, (R2.3) a blending weight associated with a Planar or DC mode is set to a predefined value, or In case no IPM is selected the blending weight associated with any other IPM is set to a predefined value, like 0, and/or a blending weight associated with a Planar or DC mode is set to a predefined value.

Figure 6:
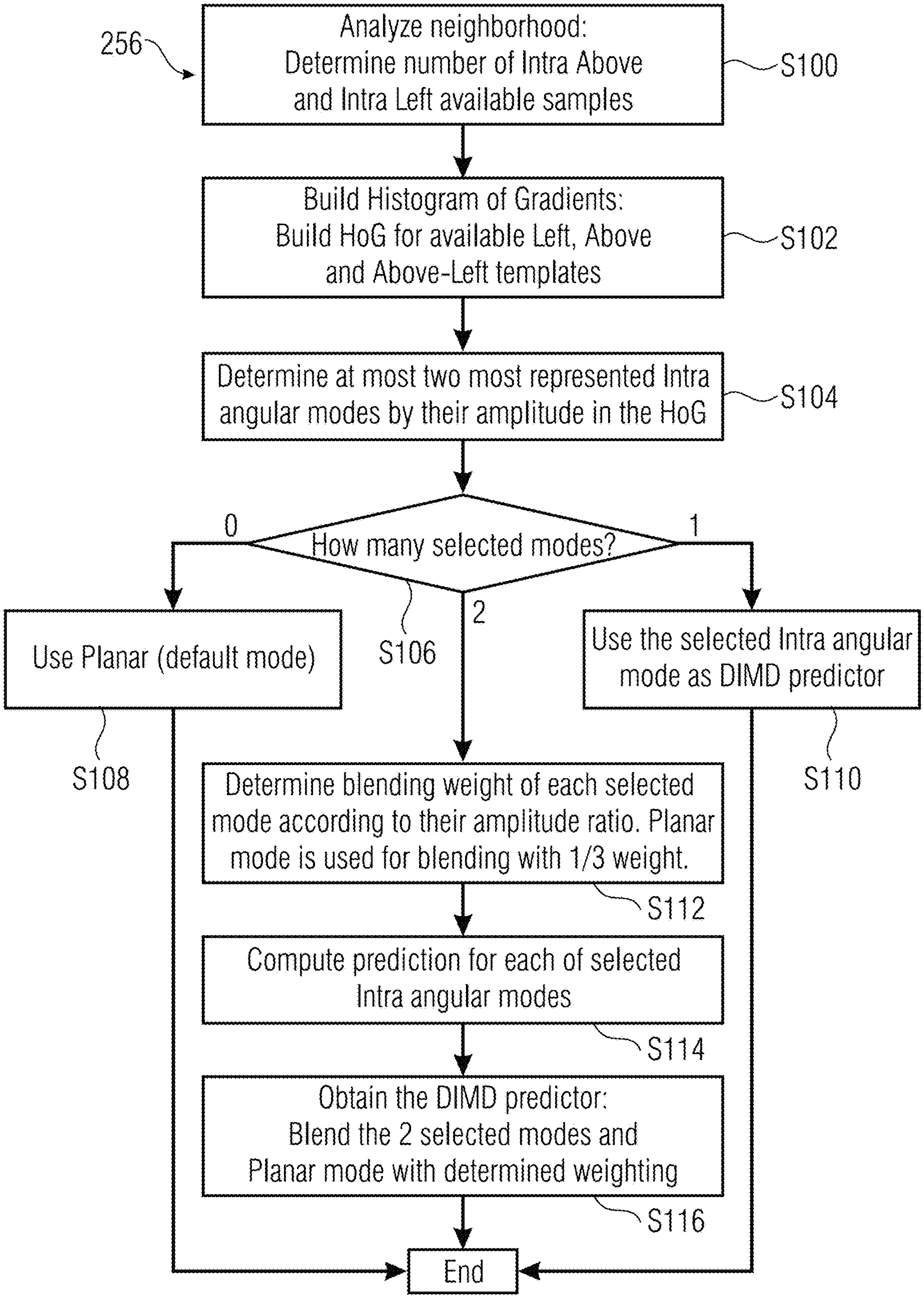
Fig. 6 (prior art)
FIG. 6 illustrates an example of a conventional DIMD predictor derivation process.
Figure 7:
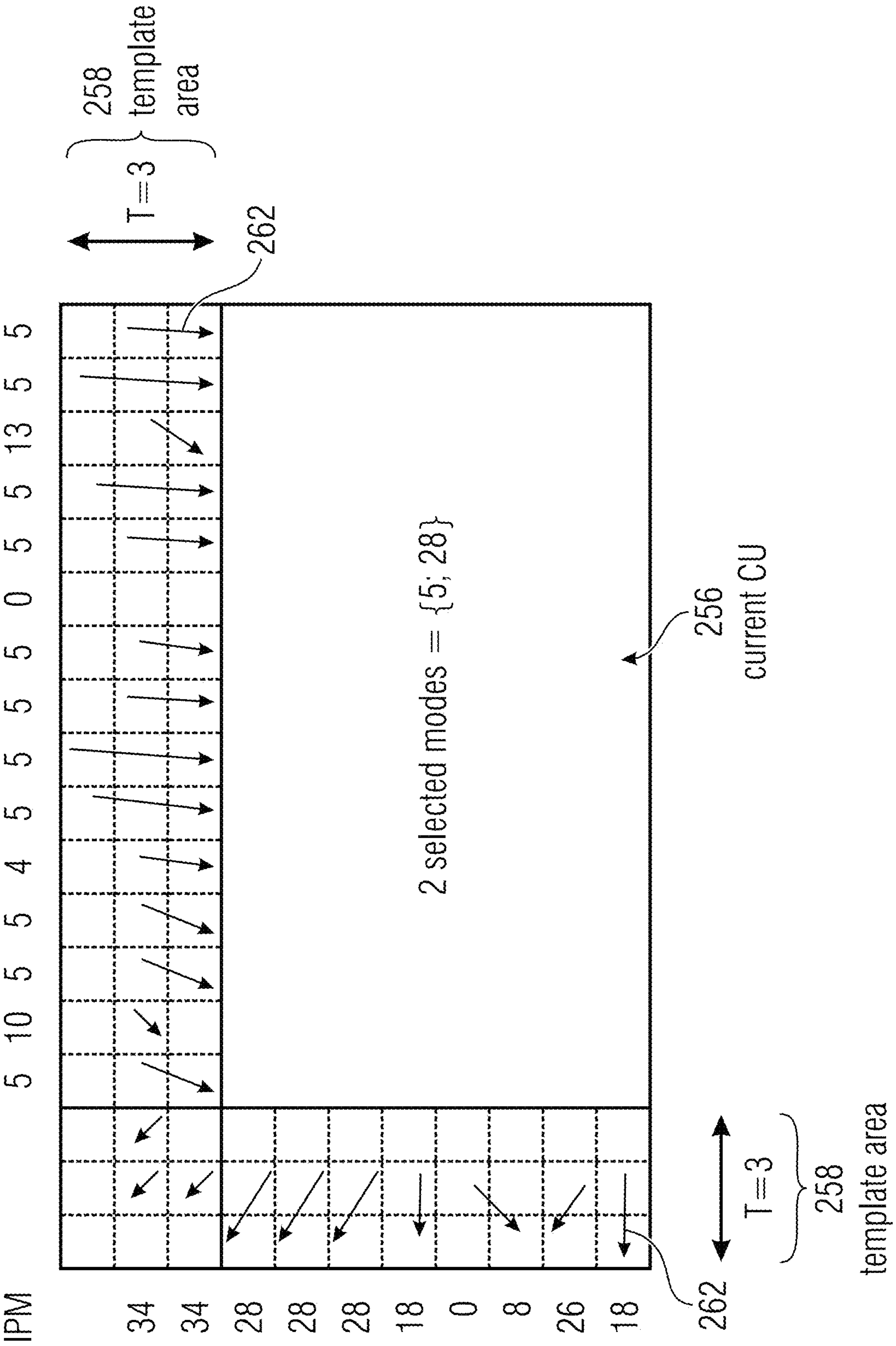
Fig. 7 (prior art)
FIG. 7 illustrates an example of a currently processed 256 and an associated template area having a width/height of samples or pixels.

Further, more detailed embodiments for determining or setting the region-wise blending weights are now described, without limiting the present disclosure to these embodiments. When considering, in accordance with embodiments, that at most two IPMs $M_1$ and $M_2$ are selected, initially the blending weights $w_1$, $w_2$, $w_3$ may be computed by a conventional process, like the one described above with reference to FIG. 6, as follows:

$$w_1 = \frac{43}{64} \times \frac{ampl(M_1)}{ampl(M_1) + ample(M_2)}$$

-continued $$w_2 = \frac{43}{64} \times \frac{ample(M_2)}{ampl(M_1) + ample(M_2)}$$

$$w_3 = \frac{21}{64}$$

When the modes M1 and M2 are selected as the 2 most represented Intra angular prediction modes in the HoG for the whole template area 258, the blending weights for each CU region are selected according to the presence of the modes M1 or/and M2 in the adjacent template area region, i.e., the above, above-left and/or left template area regions. Denoting the i-th blending weight of region r $w_{i,r}$, the blending weights for each CU region are selected as follows:

(R1.1) If M1 and M2 are present in the adjacent template area of region r, blending weights of the region r is allocated as follows:

$$w_{1,r} = w_1 \quad w_{2,r} = w_2 \quad w_{3,r} = w_3$$

(R1.2) If, only Mx (with x=1 or 2 and y is equal to the other value) is present in the adjacent template area of region r, the blending weights of the region r are allocated as follows:

$$w_{x,r} = \frac{32}{43} \times w_x \quad w_{y,r} = 0 \quad w_{3,r} = \frac{32}{64}$$

(R1.3) If, only Mx (with x=1 or 2 and y is equal to the other value) is present in the adjacent template area of region r; the blending weights of the region r are allocated as follows (the present Intra Prediction Mode is selected as the DIMD mode is without any blending):

$$w_{x,r} = 1 \quad w_{y,r} = 0 \quad w_{3,r} = 0$$

(R1.4) If $M_1$ and $M_2$ are not present in the adjacent template area of region r, blending weights of the region r are allocated as follows:

$$w_{1,r} = 0 \quad w_{2,r} = 0 \quad w_{3,r} = 1$$

Figure 12:
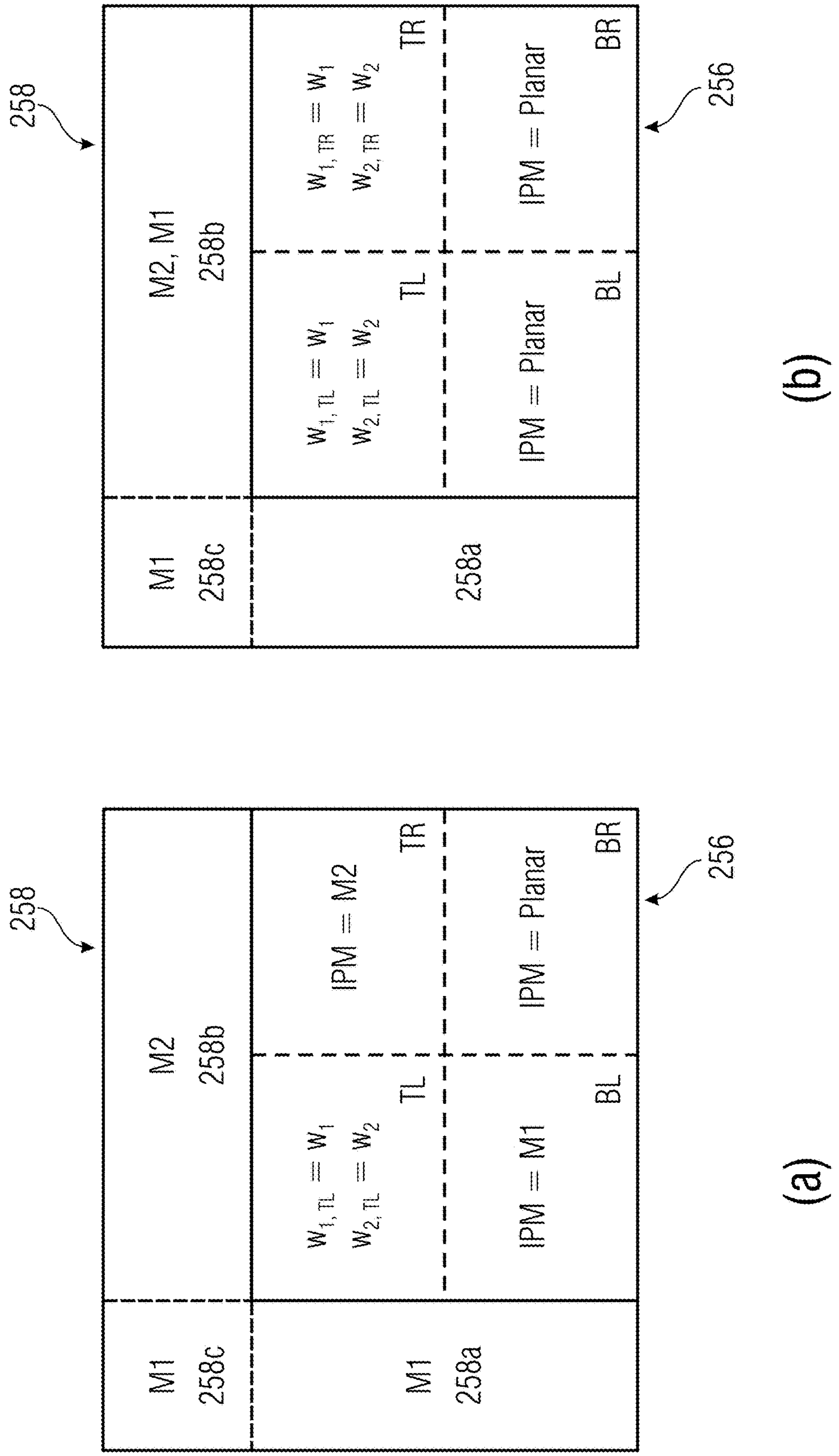
FIG. 12 illustrates the blending weights allocation in accordance with embodiments of the present disclosure.

FIG. 12 illustrates the blending weights allocation in accordance with embodiments of the present disclosure assuming that the IPMs $M_1$ and $M_2$ are selected, and in FIG. 12(*a*), it is assumed that the IPM $M_1$ is present in the left template area region 258*a* and in the above-left template area region 258*c*, while IPM $M_2$ is present in the above template area region 258*b*. On the other hand, in FIG. 12(*b*) it is assumed that the IPMs $M_1$ and $M_2$ are present in the above template area region 258*b* and the above-left template area region 258*c*, but not in the left template area region 258*a*. Thus, when considering FIG. 12(*a*) for the top-left CU region the blending weights associated with the IPMs are determined according to (R.1) above because the IPMs $M_1$ and $M_2$ are present in all template area regions adjacent to the top-left CU region. On the other hand, for the top-right and bottom-left CU regions, only the IPM $M_2$ and the IPM $M_1$, respectively, are present in the adjacent template area regions and the local or regional blending weights are calculated in accordance with (R.3) above yielding a DIMD predictor being the IPM $M_2$ and the IPM $M_1$, respectively. For the bottom-right CU region, since this region is not adjacent to any of the template area regions, the Planar or DC intra prediction mode is selected as the DIMD predictor according to (R.4) above.

In accordance with further embodiments, for the bottom-left CU region in FIG. 12(*a*), instead of applying (R.3) above, also (R.2) may be applied, so that the DIMD predictor is obtained by blending IPM $M_1$ and the Planar or DC mode. Likewise, the DIMD predictor for the top-right CU region may be obtained by blending the IPM $M_2$ and the Planar or DC according to (R.2) above.

In FIG. 12(*b*), since the two selected IPMs $M_1$ and $M_2$ are adjacent to both the top-left and top-right CU regions, the local or regional blending weights are calculated according to (R.1) above. Since no IPM is from the left template area region which is adjacent to the bottom-left CU region, the weights are calculated according to (R.4) above, yielding the DIMD predictor to be the Planar intra prediction mode or the DC intra prediction mode.

Figure 13:
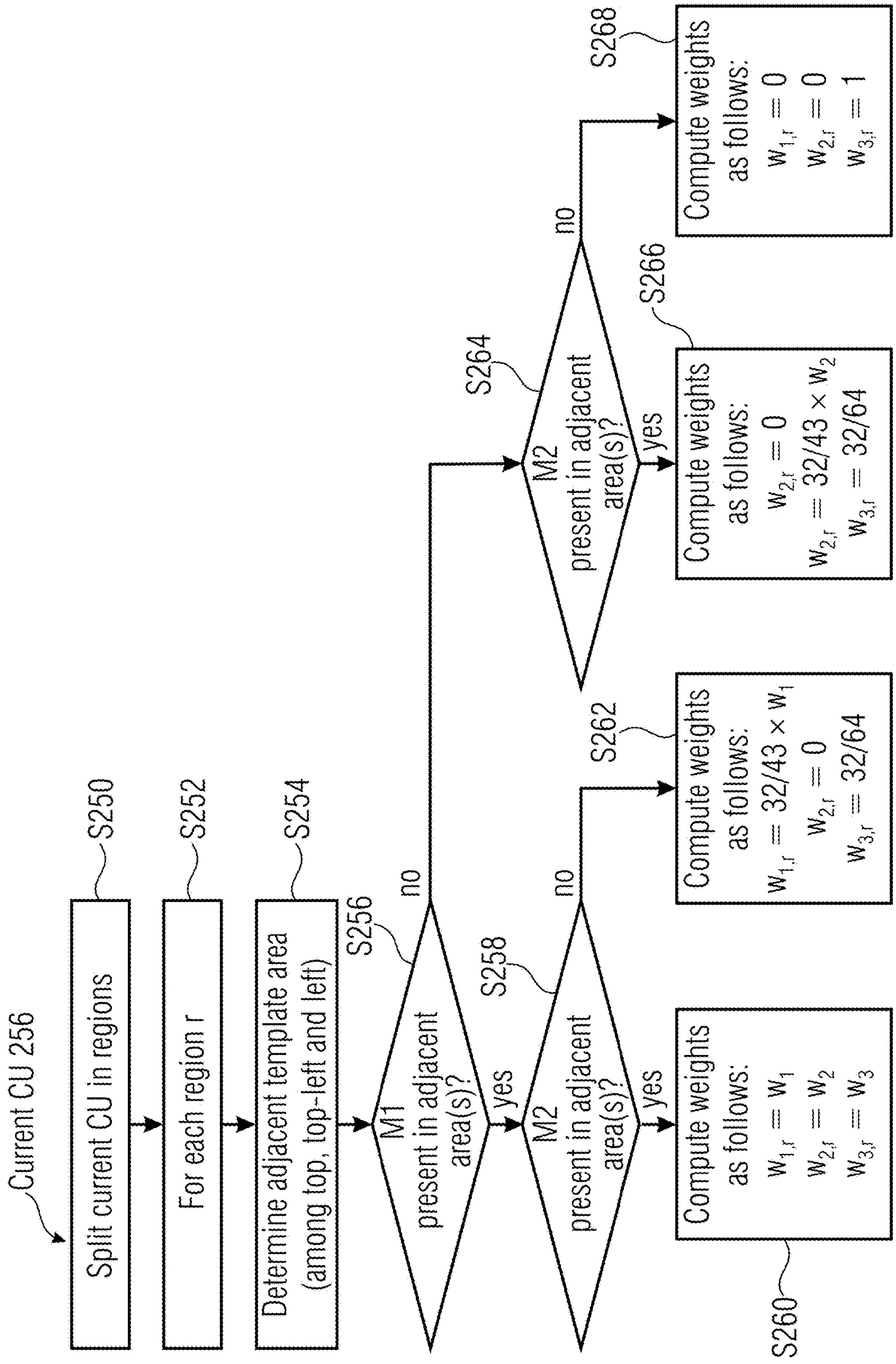
FIG. 13 illustrates a flow diagram summarizing the determination of regional blending weights in accordance with embodiments of the present disclosure.

FIG. 13 illustrates a flow diagram summarizing the above-described determination of regional blending weights in accordance with embodiments of the present disclosure. Initially, as indicated at S250, the current CU 256 is split into two or more regions and, as is indicated at S252, the subsequent steps are performed for each of the plurality of CU regions, i.e., for each region r. At S254, for the currently processed region r those areas/regions of the template area being adjacent to region r are determined among the left, and above-left template area regions 258*a*, 258*c*. At S256 it is determined whether $M_1$ is present in one or more of the template area regions adjacent to the currently processed regions r. If yes, it is determined at S258 whether $M_2$ is present in one or more of the template area regions adjacent to currently processed CU region r. If yes, at S260 the blending weights are selected according to (R1.1) above. In case it is determined at S258 that $M_2$ is not present in any of the adjacent areas, at S262 the blending weights for CU region r are calculated according to (R1.2) above. In accordance with other embodiments, in S262, the blending weights for region r may be calculated according to (R1.3) above.

In case it is determined at S256 that $M_1$ is not present in any of the template area regions adjacent to region r, it is determined at S264 whether $M_2$ is present in one or more of the template area regions adjacent to the CU region and, if yes, at S266 the local blending weights for region r are determined according to (R1.2) or according to (R1.3) above. In case it is determined at S254 that $M_2$ is not present in any of the adjacent areas, the local blending weight for region r is determined according to (R1.4) above.

In case only one IPM $M_1$ is selected from the HoG for the entire template area 258, the blending weights for each region r are selected according to the presence of the IPM $M_1$ in an template area region adjacent to the respective CU region as follows:

(R2.1) If M1 is present in the template area region adjacent to CU region r; the blending weights of the region r are allocated as follows (the present Intra Prediction Mode is selected as the DIMD mode is with blending):

(R2.2) If M1 is present in the template area region adjacent to CU region r; the blending weights of the region r are allocated as follows (the present Intra Prediction Mode is selected as the DIMD mode is without any blending):

$$w_{1,r} = 1 \quad w_{2,r} = 0 \quad w_{3,r} = 0$$

(R2.3) If $M_1$ is not present in the template area region adjacent to CU region r; the blending weights of the region r are allocated as follows:

$$w_{1,r} = 0 \quad w_{2,r} = 0 \quad w_{3,r} = 1$$

Figure 14:
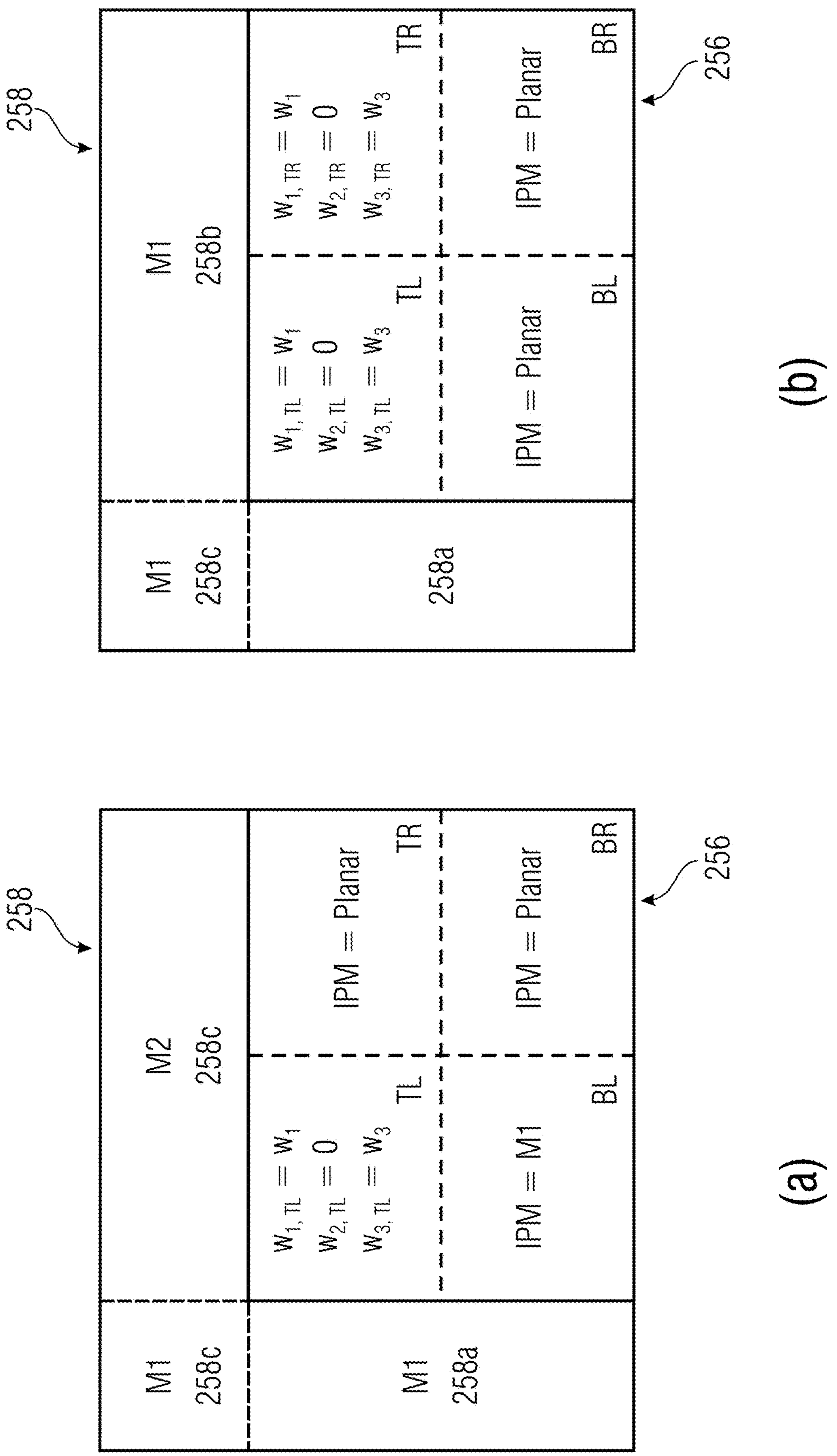
FIG. 14 illustrates the blending weights allocation in accordance with embodiments of the present disclosure.

FIG. 14 illustrates the blending weights allocation in accordance with embodiments of the present disclosure when only one IPM $M_1$ is selected. In FIG. 14(*a*), it is assumed that the IPM $M_1$ is present in the left template area region 258*a* and the above-left template area region 258*c* but is not present in the above template area region 258*b*. On the other hand, in FIG. 14(*b*), the IPM $M_1$ is present only in the above-left template area region 258*c* and in the above template area region 258*b* but not in the left template area region 258*a*. As may be seen from FIG. 14(*a*), the regional weights for the top-left CU region are determined according to (R2.1) above while for the bottom-left CU region they are determined according to (R2.2) above, i.e., while for the top-left CU region, a blending of the IPM $M_1$ and the Planar mode or DC mode is performed, no such blending is performed for the bottom-left CU region. For the top-left CU region, since IPM $M_1$ is not present in the adjacent above template area region 258*b*, the Planar mode or DC mode is selected as DIMD predictor (R2.3). In FIG. 14(*b*), the local or regional blending weights for the top-left and top-right CU regions are determined according to (R2.1) while for the bottom-left region they are determined according to (R2.3) as IPM $M_1$ is not present in the left template area region 258*a*.

In case no IPM is selected from the HoG from the entire template area 258, the blending weights of the respective regions r are located as follows:

$$w_{1,r} = 0 \quad w_{2,r} = 0 \quad \text{and} \quad w_{3,r} = 1$$

Thus, in such a case, for all CU regions, the Planar or DC intra prediction mode is used as the DIMD predictor.

In accordance with embodiments, a selected IPM $M_x$ may be considered to be present in a template area region in case there is at least one sample position in the template area region for which the amplitude of $M_x$ is greater than a predefined threshold, like an amplitude of greater than 50. In accordance with other embodiments, a selected IPM $M_x$ may be considered to be present in a template area region, if there are more than a predefined number of sample positions associated with the IPM $M_x$ in the template area region, for example in case there are more than two filtered sample positions for which the mode $M_x$ is determined.

Figure 15:
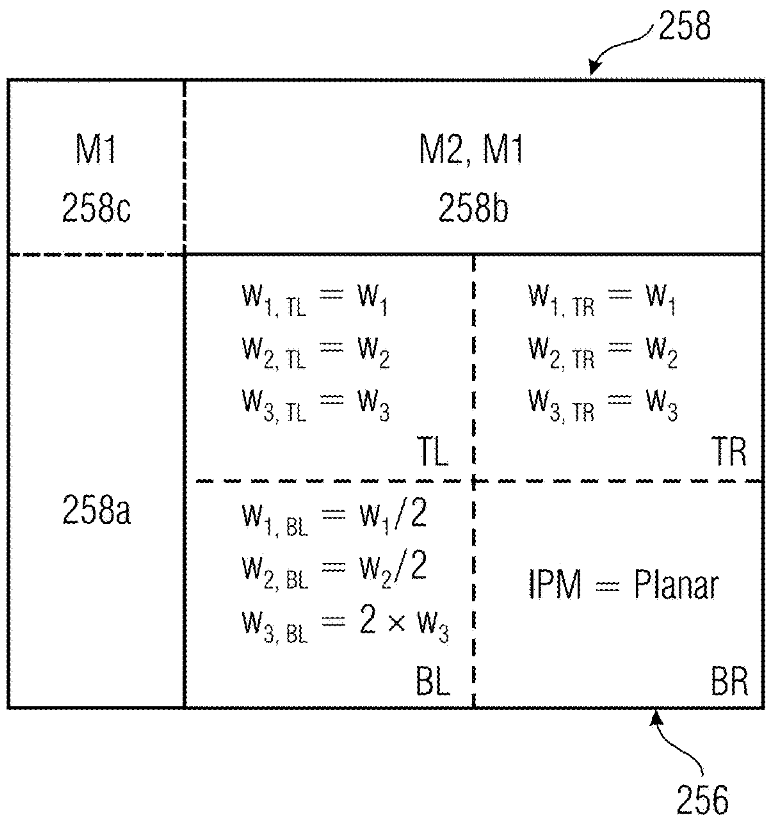
FIG. 15 illustrates the use of blending weights which are weighted according to a distance of a certain CU region to template area regions including the selected IPMs.

In accordance with further embodiments, the blending weights associated with $M_1$ and $M_2$ for a certain region that is adjacent to one or more template area regions from which the IPMs are selected, may be used for other CU regions which are adjacent to a template area region for which no IPM is selected. In such further CU regions, the blending weights from the first CU region may be decreased, while $w_{1,r}+w_{2,r}+w_{3,r}=1$ applies. FIG. 15 illustrates the use of blending weights which are weighted according to a distance of a certain region to template area regions including the selected IPMs. In FIG. 15 a situation is assumed similar to FIG. 12(*b*), and in accordance with FIG. 15, for the top-left and top-right CU regions the blending weights are calculated according to (R1.1) above. Other than in FIG. 12(*b*) in the bottom-left CU region, rather than selecting the Planar mode as the DIMD predictor, the DIMD predictor is obtained by blending the weighted blending weights for the top-right CU region wherein the blending weights $w_1$ and $w_2$ are weighted by ½ and the blending weight $w_3$ is weighted by a factor of 2 so that $w_{1,BL}+w_{2,BL}+w_{3,BL}=1$. Optionally, this may also be applied to the bottom-right CU region. In accordance with further embodiments, this may also be this may also be for the bottom-left CU region in FIG. 12(*a*) by using a weighted blending weight $w_2$ from the top-left CU region.

2$^{nd}$ Aspect: Regional Blending Weights Derivation Using Weights Computed for Each Template Area Region In the above described embodiments for the first aspect of the present disclosure, the blending weights are computed for the entire template area using the accumulated amplitudes of the selected IPMs being stored in the HoG. In accordance with embodiments of the second aspect of the present disclosure, the blending weights are computed per adjacent template area. In accordance with such embodiments, a HoG is computed not for the entire template area but only for the part of the template area to which the CU region is adjacent, e.g., for the left template area region 258*a* and/or for the above template area region 258*b*. In accordance with embodiments, the above-left area region 258*c* may be handled as follows:

- it is allocated to above template area region, or
- it is allocated to the left template area region, or
- it is allocated to both the above and left template area regions, or
- it is treated as a separate template area region.

The currently processed CU 256 is split into a plurality of separate CU regions in a way as described above with reference to the embodiments of the first aspect.

When a current CU region is adjacent to several template area regions, the HoG is computed over the adjacent template area and the one or more IPMs are selected based on the cumulated amplitude peak in the adjacent template area for which the HoG is computed. For example, for the top-left CU region, which is adjacent to the left-template area region 258*a*, the above template area region 258*b* and the above-left template area region 258*c*, the blending weights are computed on the basis of the entire template area statistics, i.e., on the basis of a HoG computed over the entire template area 258 and, therefore, the determination of the blending weights for the top-left CU region is the same as described above with reference to the first aspect. On the other hand, the top-right CU region is adjacent only to the above template area region 258*b*, and the HoG is computed only over this above template area region 258*b*. At least one IPM is selected based on the accumulated amplitude peaks, and the weighting to be applied in the top-right CU region is selected based on the weights determined for the above template area region computed HoG. In case there is only one IPM selected, the blending weight for the top-right CU region may be selected according to (R2.1) to (R2.3) described above with reference to the first aspect. In case there are two IPMs selected from the template area region to which the top-right region is adjacent, the blending weights for the top-right region are selected according to (R1.1) to (R1.4) described above with reference to the first aspect.

Figure 16:
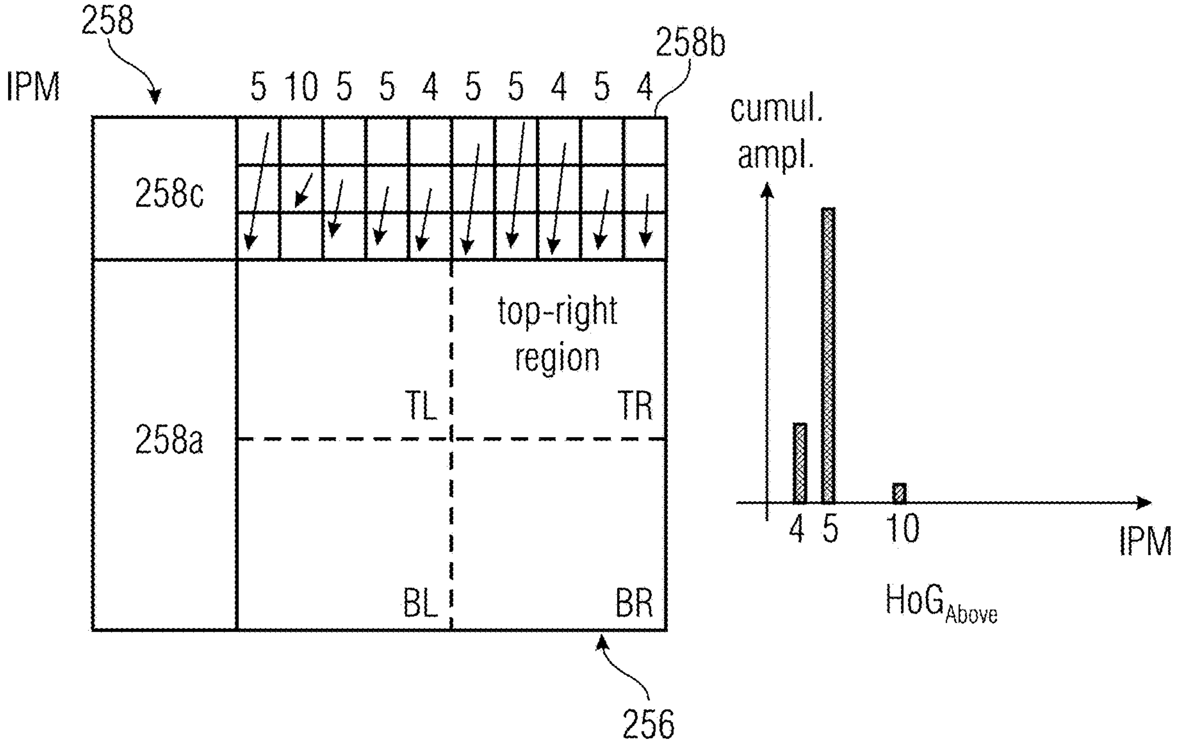
FIG. 16 illustrates the per-template area region computation of the HoG.

FIG. 16 illustrates the per-template area region computation of the HoG. For the top-right region of the currently processed CU which is adjacent only to the above template area region 258*b*, for each midline sample in the region the associated IPM is shown and its orientation is illustrated by the direction of the respective arrow while its amplitude is indicated by the length of the arrow. For determining the regional or local blending weights for the top-right region of the currently processed CU 256, the $HoG_{Above}$ is determined and yields, in the depicted embodiment, the IPMs 4, 5 and 10. Either only one of IPMs 4 and 5 or both IPM 5 and IPM 4 are selected and used for determining the blending weights for the top-right region of the CU 256. In accordance with embodiments, the different HoGs for the left, above and above-left template area regions may be calculated in a way as described above with reference to the first aspect (see FIG. 10 at step S222). For each template area region, the intra mode and amplitude for each filtering window position in the respective template area region is stored and one or more of the most represented IPMs may be determined in the HoG for the template area region considered (see FIG. 10 at step S224). In other words, the blending weight computation is similar as in the first aspect of the present disclosure except that HoG is not performed on the entire template area but only on the one or more template area regions adjacent to a CU region for which the blending weights are computed.

In the embodiment of FIG. 16, in case of selecting two IPMs, namely mode 4 and mode 5, the ratio of amplitudes used to determine $w_{1,TR}$ and $w_{2,TR}$ is computed based on the amplitudes of the selected IPMs relative to the HoG computed for the above template area region. In other words, the ratio of amplitudes is computed based on the cumulated amplitudes from the HoG for the one or more adjacent template area regions. For the above-left region, the HoG is computed for the above, above-left and left template area regions. For the bottom-left region, the HoG is computed only on the basis of the left template area region 258*a*. For the bottom-right region, the Planar or DC mode may be selected as the predictor. In accordance with other embodiments, for the bottom-right region respective IPMs may be selected and a HoG may be computed based on one or more IPMs from one of the above, the above-left and the left template area regions or a combination thereof.

Regarding the IPMs selected in the different template area regions, it is noted that the same or different IPMs may be selected in different template area regions, and also the number of IPMs selected may vary per each template area region, i.e., the number of IPMs selected for the different template area regions may be the same or different. In accordance with embodiments, a maximum number of IPMs selected per template area region may be one or two.

Embodiments of the second aspect are advantageous over approaches using only one or more IPMs selected from the entire template area because they allow for adjusting the content characteristics locally as using the respective IPMs obtained from the different area template regions better matches different regions of the currently processed CU. When using IPMs for all regions which are selected from the HoG for the entire template area, the selected IPMs which may be present in different template area regions may have content characteristics that are different between the respective template area regions, like slightly different directions or angles. Indeed, the number of possible IPMs, for example 67 without counting wide angular intra modes, may create wide peaks in the HoG for which selected modes match most of the regions but may not be suitable for matching local characteristics of a specific CU region.

Figure 17:
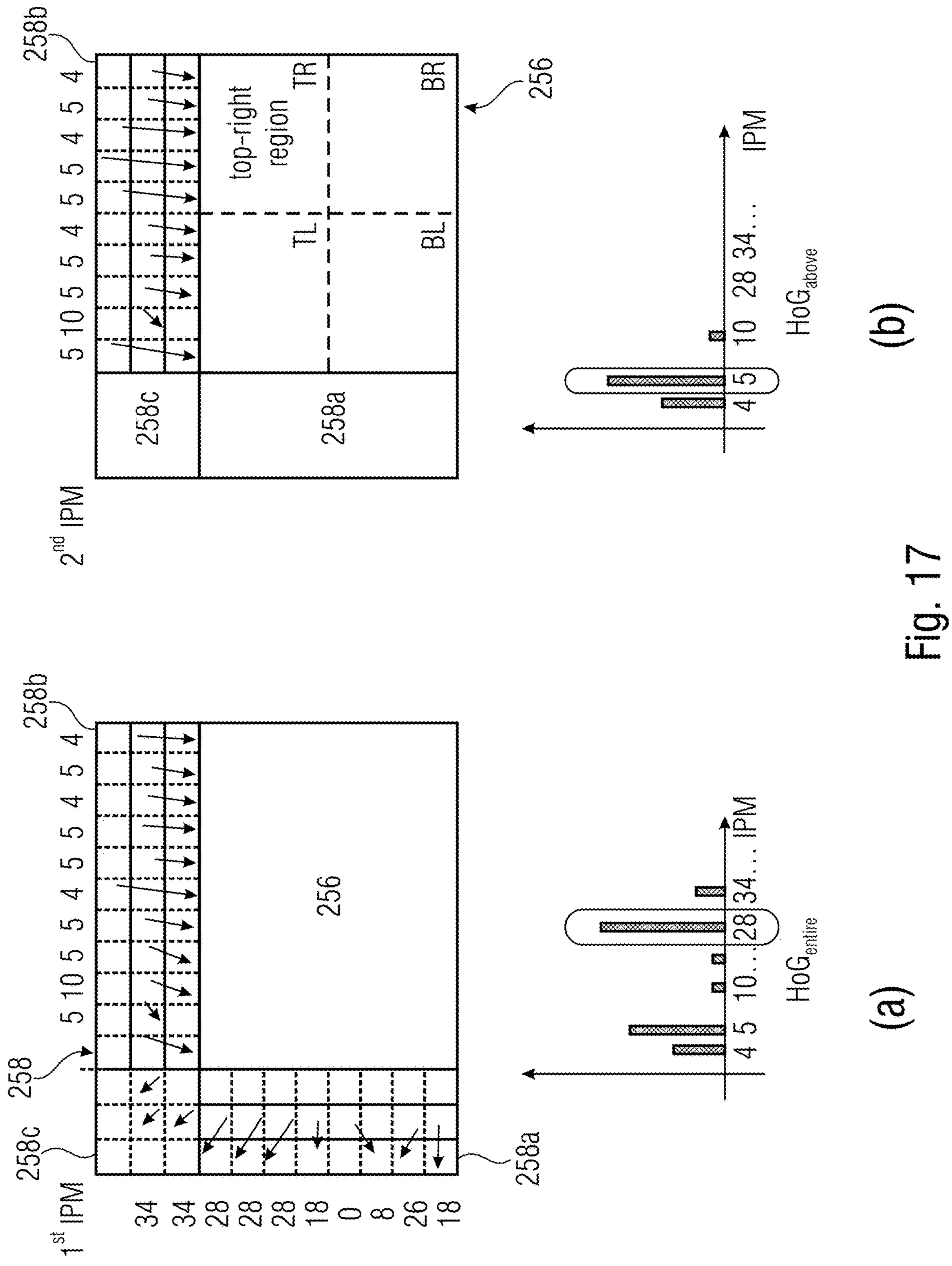
FIG. 17 illustrates an embodiment where a first IPM is selected based on an entire HoG and a second IPM is selected on the basis of an HoG for an adjacent template area.

In accordance with other embodiments of the second aspect, in case more than one IPM is selected, the first IPM may be computed on the basis of the entire template area 258, i.e., over the above, left and above-left template area regions, while the second IPM is selected from the template area region which is adjacent to the CU region for which the blending weights are to be calculated. The second IPM, in accordance with embodiments, is selected if it is different from the first IPM. In case there are no IPMs selected as a second IPM, the first selected IPM may be used as the DIMD predictor. On the other hand, if the second IPM is equal to the first IPM, the second best peak in the adjacent template area region HoG is allocated as the second IPM. FIG. 17 illustrates an embodiment in accordance with which a first IPM is selected based on an entire HoG and a second IPM is selected on the basis of an HoG for an adjacent template area. In the embodiment of FIG. 17, when considering the top-right region of the currently processed CU 258, a first IPM, as illustrated in the left part of the figure, is determined from the $HoG_{entire}$ calculated over the entire template area 258, and the second IPM is determined from the $HoG_{above}$, calculated only for the above template area region. In the depicted embodiment, IPM 28 is selected as first IPM and IPM 5 is selected as second IPM. Based on the selected IPMs, the blending weights are calculated as described above with reference to the first aspect of the present disclosure.

Figure 18:
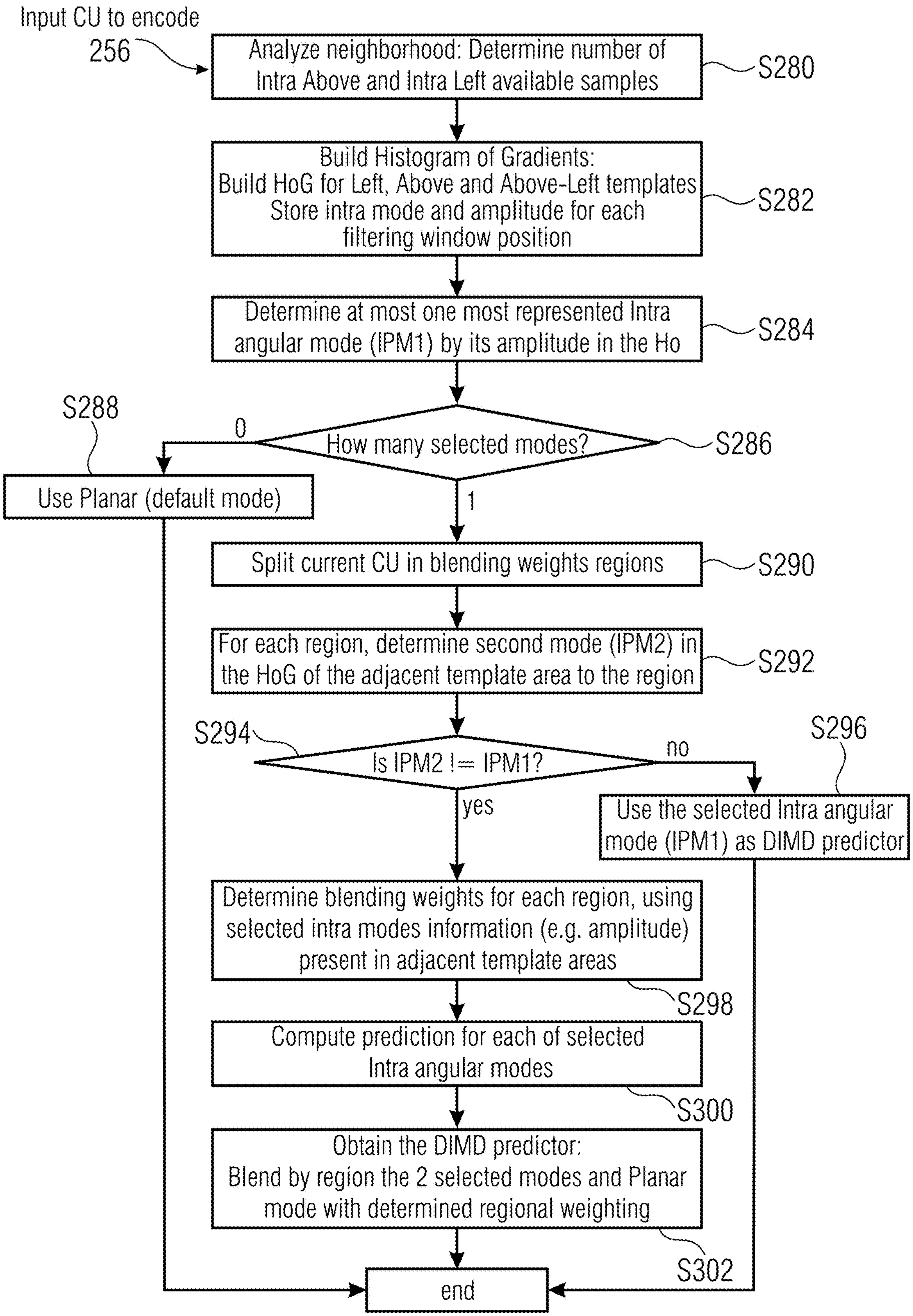
FIG. 18 illustrates a flow diagram of an embodiment of the present disclosure in accordance.

FIG. 18 illustrates a flow diagram of an embodiment of the present disclosure in accordance with which the first angular IPM is selected from the entire template area HoG and the second IPM is selected from the HoG of an adjacent template area to a CU region. At S280, the neighborhood of a CU 256 to be processed is analyzed so as to determine a number of available intra-above and intra-left samples. At S282, a histogram of gradients is built, more specifically the HoG for the left, above, and above-left template area regions 258*a* to 258*c* is determined. Further, the respective intra modes and amplitudes for each filtering window position are stored. At S284, the first IPM, for example, the most represented IPM from the entire HoG is determined, and at S286 it is determined how many IPMs are selected. In case no IPM 1, i.e., no first IPM is selected, for example, because there is no IPM having an amplitude above a certain threshold, the Planar or DC intra prediction mode is used as the DIMD predictor, as is indicated at S288. Otherwise, in case a first IPM is selected, the current CU 256 is split into a plurality of CU or blending weight regions at S290. At S292, for each region a second IPM is determined in the HoG established for a template area region to which a certain CU region is adjacent. At S294, it is determined whether a second IPM, which is determined at S294, is equal to the first IPM. In case the two IPMs are the same, at S296, the first IPM is used as the DIMD predictor. Otherwise, in case the selected IPMs are different, the blending weights for a certain CU region are determined using the IPMs present in template area regions adjacent to the CU region for which the localized or regional blending weights are calculated, as is indicated at S298. At S300, the predictions for each IPM selected are calculated and, at S302, the DIMD predictor is obtained by blending, per region, the two selected IPMs and a Planar mode using the determined regional or local blending weights. The actual blending weights may be calculated in a way as it is described above with reference to embodiments of the first aspect of the present disclosure, e.g., in accordance with (R1.1) to (R1.4).

Regarding the bottom-right CU region, which has no adjacent template area regions, in accordance with embodiments, the second IPM may be selected also from the entire template area HoG. In accordance with other embodiments, only the first IPM is selected and used as the DIMD predictor for the bottom-right CU region, or only the Planar or DC mode is used as the DIMD predictor for the bottom-right region. In accordance with yet other embodiments, the DIMD predictor may be obtained by blending the Planar or DC mode with the first IPM with a weight of 0.5.

In accordance with embodiments, the blending weights may be computed according to the ratio of cumulated amplitudes of the entire template area HoG, and the weight of the second IPM may be greater than the weight of the first IPM, for example ⅔ of the ratio of cumulated amplitudes with the second IPM for a first IPM, and 4/3 of the ratio of the cumulated amplitudes for a second IPM and ⅓ for Planar.

In accordance with a further embodiment, if the first IPM is present in an adjacent template area region, in which the second IPM is also present, the ratio of cumulated amplitudes used to determine the blending weights may be computed based on the cumulated amplitudes in the adjacent template regions HoG.

In accordance with further embodiments, if there is no intra angular mode selected as a second IPM, the first IPM may be blended with the Planar or DC mode using a weight of 0.5. In case more than two IPMs are selected, for example three or more, the two first IPMs may be computed from the entire template area HoG and the third IPM may be computed from an adjacent template area region HoG. In accordance with other embodiments, only the first IPM may be computed from the entire template area HoG while the further, like the second and third IPMs, may be computed from the template area region HoG.

3rd Aspect: Regional Blending Weights Derivation Using Weights Computed for Partial Template Area In accordance with a third aspect of the present disclosure, the blending weights, more specifically the localized or regional blending weights for the respective CU regions, are computed per portion of adjacent sets of samples in the template area, i.e., using only the position of the filtering window which center sample projection is adjacent to the CU region of the currently processed CU. Conceptually, the template area 258 is split with the same vertical and horizontal lines as the currently processed CU so that each CU region is attached to a portion of a template area, and the one or more IPMs are selected from the HoG generated for this portion of a template area, referred to in the following as the partial template area or partial template area region.

Figure 19:
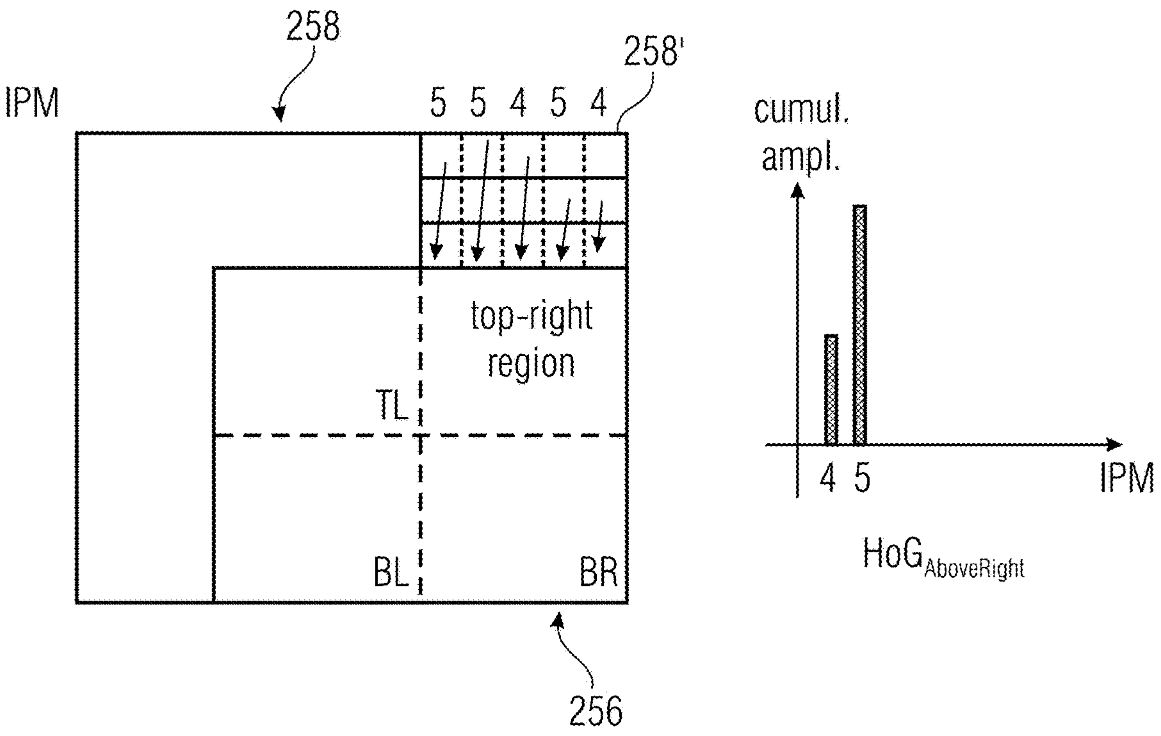
FIG. 19 illustrates embodiments of a partial usage of the template area for computing partial template area HoGs to be employed in the derivation of local blending weights.
Figure 19:
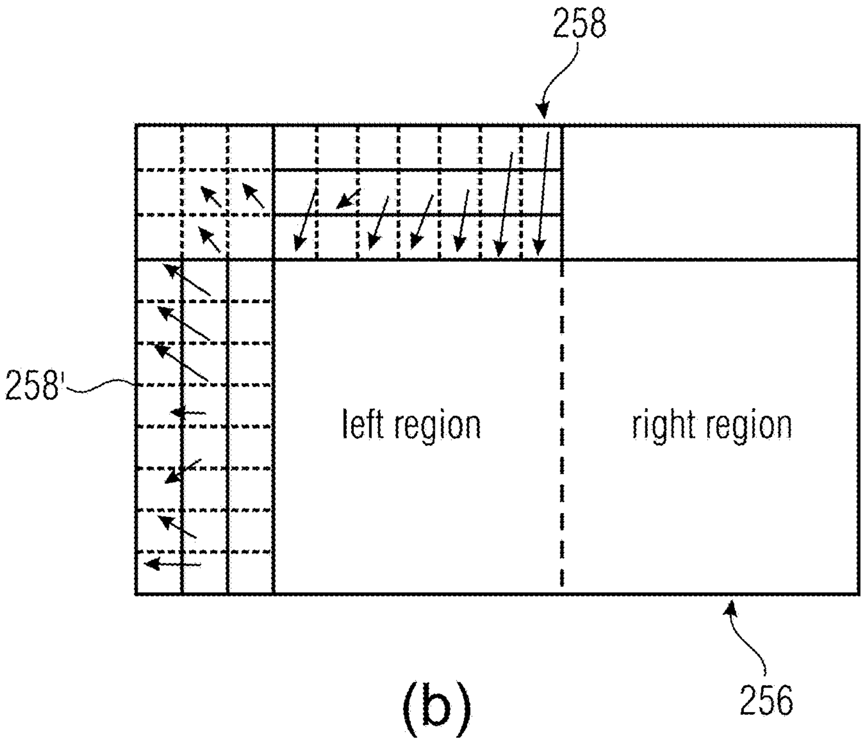

FIG. 19 illustrates embodiments of a partial usage of the template area for computing partial template area HoGs to be employed in the derivation of local blending weights. FIG. 19(*a*) illustrates an embodiment in accordance with which the IPMs for determining the blending weights for the top-right region of the CU 256 are determined by a partial template area 258' which is achieved by splitting the above template area region 258*b* along the vertical dashed line splitting the CU 256. For the partial template area 258', the HoG, referred to in the figure as $HoG_{AboveRight}$, is determined. In the depicted embodiment, the HoG yields IPM 4 and IPM 5, and for the respective midline samples the orientations are indicated by the arrows and the amplitudes are indicated by the length of the arrows. The HoG shows the cumulated amplitudes of the IPMs, i.e., the three cumulated amplitudes for IPM 5 and the two cumulated amplitudes for IPM 4. FIG. 19(*b*) illustrates a CU 256 split into a left region and into a right region, and the left region the partial template area 258' adjacent to the left CU region which comprises the left template area region 258*a*, the above-left template area region 258*c* and a part of the above template area region 258*b*. FIG. 19(*c*) illustrates a CU 256 split into the four regions, as in FIG. 19(*a*), and illustrates for the above-left region the partial template area 258' including a part of the left template area region 258*a*, a part of the above template area region 258*b* and the above-left template area region 258*c*. As may be seen from FIG. 19, the width/height of a partial template area defined in the above or left template area regions is defined by the vertical/horizontal lines defining the respective CU regions. The concepts according to the first and second aspects apply to the partial template area regions, except that only the strict part or portion of the template area adjacent to the CU region is considered. Thus, the HoG computation and the IPM selection occurs on samples present only in the respective partial template areas 258', i.e., the area of the template area in which the samples are adjacent to a certain CU region for which the blending weights are to be determined.

Figure 20:
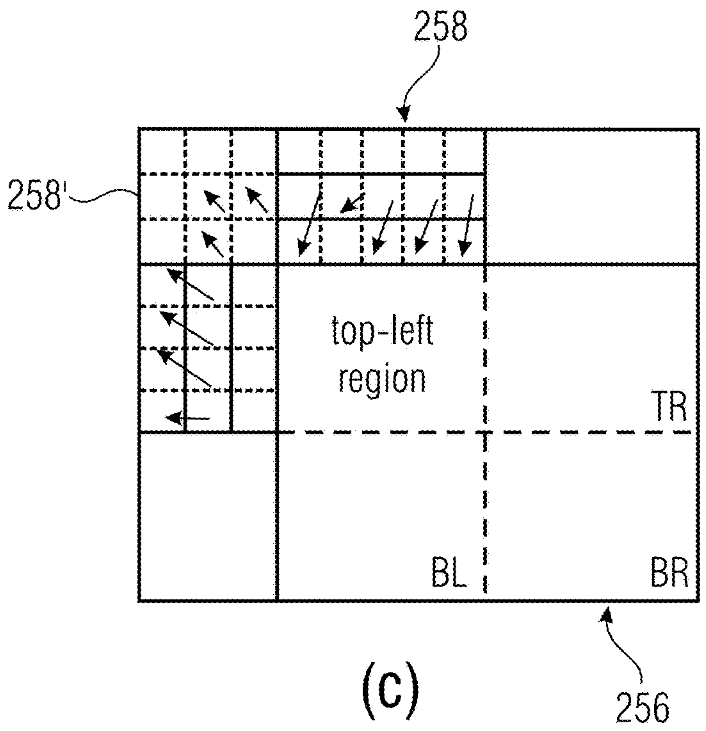
FIG. 20 illustrates an embodiment of using a mix of partial and full/entire template area regions for calculating the HoG for selecting the one or more IPMs.
Figure 20:
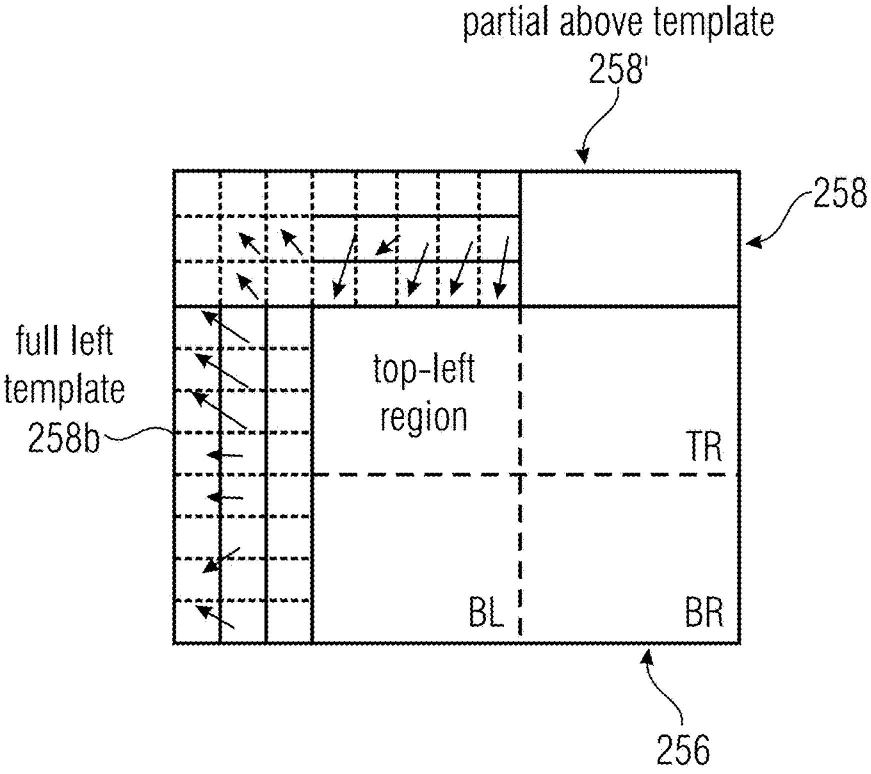

The third aspect of the present disclosure is advantageous, as the adaption and matching to local characteristics of a certain CU region is a better match. In accordance with embodiments, if the directions in the respective template area regions are far from either horizontal for the left template area region or from vertical for the above template area region, additional information collected from neighboring template area portions may be incorporated so that, in accordance with embodiments, the second aspect and the third aspect may be combined. FIG. 20 illustrates an embodiment of using a mix of partial and full/entire template area regions for calculating the HoG for selecting the one or more IPMs. As is illustrated in FIG. 20, in accordance with embodiments, the CU 256 is split into the four CU regions, and for the above-left region only the partial above template area being a part of a left template area region 258 is used, while the entire left template area region is used, i.e., the template area region for which the HoG is computed for selecting the IPMs comprises the left template area region 258*a*, the above-left template area region 258*c* and the part of the above template area region which is adjacent to the top-left CU region. In accordance with further embodiments, when a plurality of IPMs, like two or more IPMs may be selected, one or some but not all IPMs may be determined from an HoG obtained for the entire left template area region while the remaining IPMs are obtained from an HoG obtained for the partial template area. In accordance with further embodiments, the first IPM may be calculated on the basis of the entire template area while the second IPM may be determined based on an HoG only for the partial template area.

The blending weights are determined per CU region and, consequently, the number of blending weights may depend on the current CU region for which the local blending weights are currently calculated.

In accordance with embodiments, the blending weights may be computed according to the ratio of cumulated amplitudes of the entire template area HoG, and the weight of the second IPM may be greater than the weight of the first IPM, for example ⅔ of the ratio of cumulated amplitudes with the second IPM for a first IPM, and 4/9 of the ratio of the cumulated amplitudes for a second IPM and ⅓ for Planar.

In accordance with a further embodiment, if the first IPM is present in an adjacent template area region, in which the second IPM is also present, the ratio of cumulated amplitudes used to determine the blending weights may be computed based on the cumulated amplitudes in the adjacent template regions HoG.

In accordance with further embodiments, if there is no inter angular mode selected as a second IPM, the first IPM may be blended with the Planar or DC mode using a weight of 0.5. In case more than two IPMs are selected, for example three or more, the two first IPMs may be computed from the entire template area HoG and the third IPM may be computed from an adjacent template area region HoG. In accordance with other embodiments, only the first IPM may be computed from the entire template area HoG while the further, like the second and third IPMs, may be computed from the template area region HoG.

In accordance with further embodiments of the third aspect of the present disclosure, a direction of an IPM having the highest peak (cumulated amplitudes) in the global HoG which is computed for the entire template area may determine which template area region is to be used entirely and which template area region is to be used partially. For example, if the main direction in the HoG computed for the entire template area or for a template area region is more vertical than horizontal, for example the IPM is between 34 and 66 and between 53 and 66, inclusive, the top-left CU region may use the partial above template area 258' (see FIG. 20) and the entire left template area region. Otherwise, in case the main direction in the HoG is more horizontal than vertical, like IPMs between 2 and 34 and greater than 66, inclusive, the top-left CU region (see FIG. 20) may use the entire above template area region, the entire above-left template area region and only a partial left template area region.

FURTHER EMBODIMENTS

So far, the inventive concept has been described with reference to aspects and embodiments concerning methods for determining a DIMD predictor. In accordance with further embodiments, the present disclosure also provides an apparatus of deriving DIMD predictor as well as encoders/decoders including such an apparatus.

Figure 21:
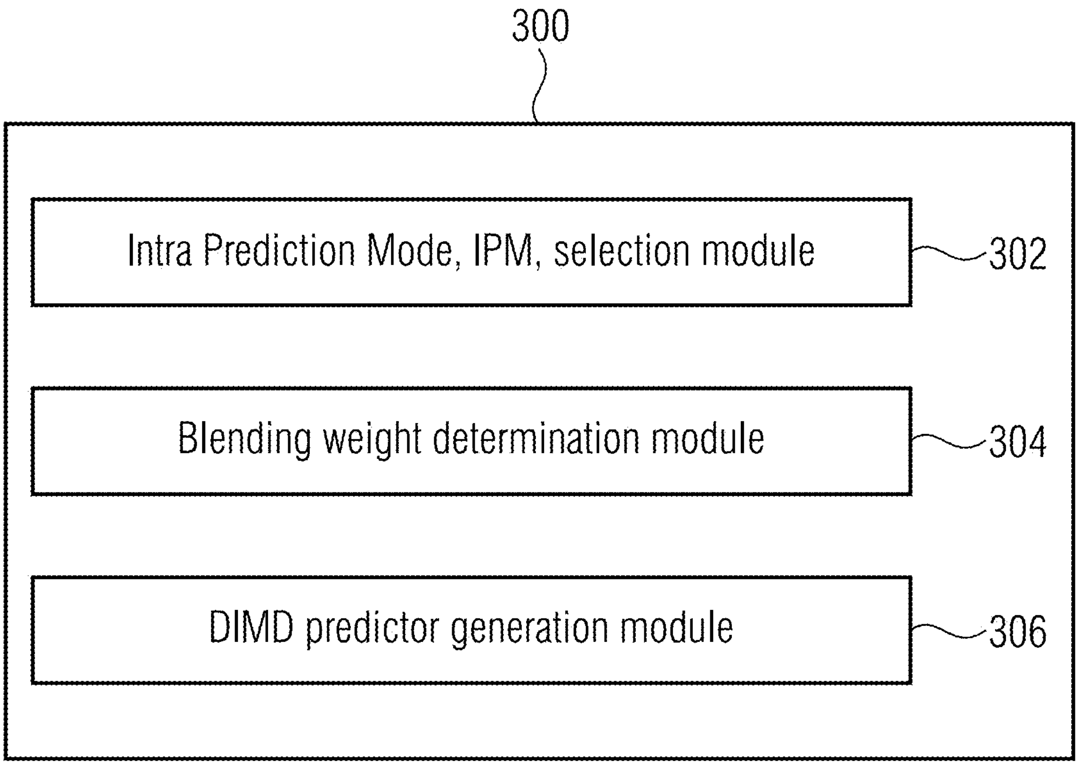
FIG. 21 illustrates a block diagram of an apparatus of deriving DIMD predictor in accordance with embodiments of the present disclosure.

FIG. 21 illustrates a block diagram of an apparatus for deriving a Decoder-side Intra Mode Derivation, DIMD, predictor for respective samples of a coding unit, CU, of a picture in accordance with embodiments of the present disclosure. The apparatus 300 includes the following modules:

- 302: an Intra Prediction Mode, IPM, selection module configured to select one or more IPMs in a template area adjacent to the CU.
- 304: a blending weight determination module configured to determine blending weights for blending at least the one or more selected IPMs.
- 306: a DIMD predictor generation module configured to generate the DIMD predictor by blending the one or more selected IPMs using the determined blending weights for the CU so that the blending varies over the CU.

Figure 22:
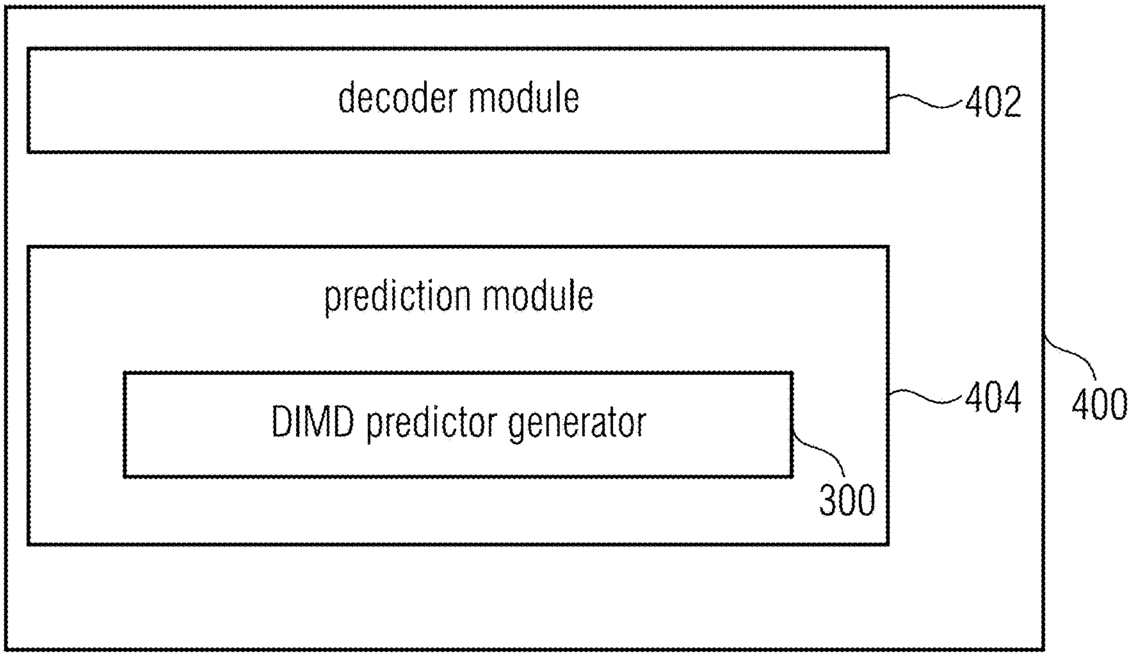
FIG. 22 illustrates a block diagram of a decoder in accordance with embodiments of the present disclosure.

FIG. 22 illustrates a block diagram of a decoder for decoding an encoded data stream, the encoded data stream including data representing a picture in accordance with embodiments of the present disclosure. The decoder 400 includes the following modules:

402: a decoder module configured to decode from the encoded data stream the picture.

404: a prediction module including an apparatus for deriving a Decoder-side Intra Mode Derivation, DIMD, predictor for respective samples of a coding unit, CU, of the picture in accordance with embodiments of the present disclosure.

Figure 23:
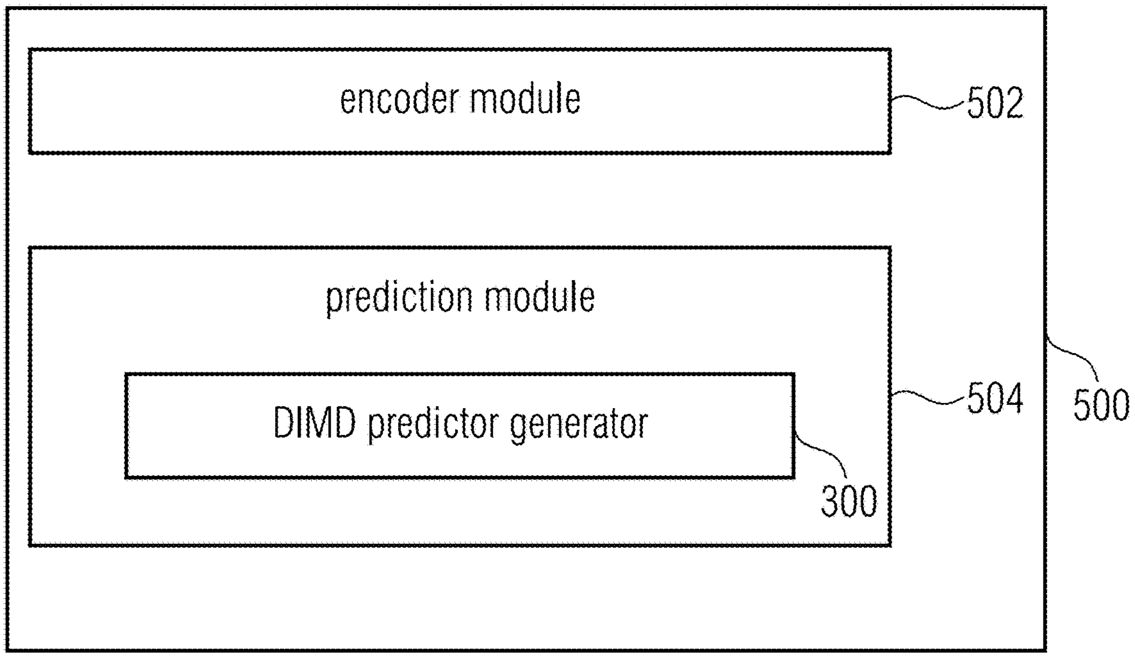
FIG. 23 illustrates a block diagram of an encoder in accordance with embodiments of the present disclosure.

FIG. 23 illustrates a block diagram of an encoder for encoding a picture into an encoded data stream, the encoded data stream including data representing the picture in accordance with embodiments of the present disclosure. The encoder 500 includes the following modules:

502: an encoder module configured to receive the original picture and to encode the picture into the encoded data stream.

504: a prediction module, the prediction module including an apparatus for deriving a Decoder-side Intra Mode Derivation, DIMD, predictor for respective samples of a coding unit, CU, in accordance with embodiments of the present disclosure.

Although some aspects of the disclosed concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 24:
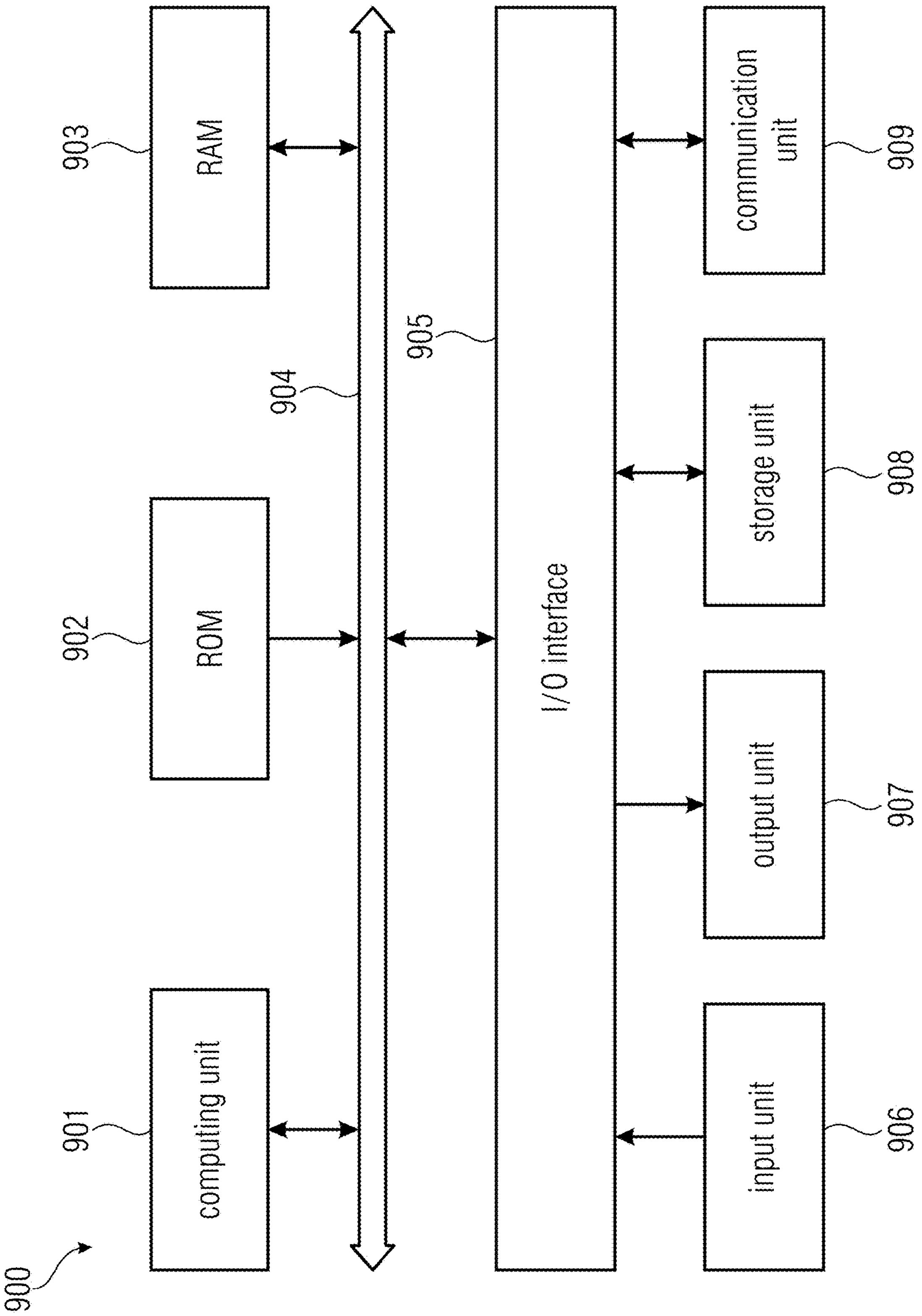
FIG. 24 illustrates a block diagram illustrating an electronic device 900 according to embodiments of the present disclosure.

FIG. 24 is a block diagram illustrating an electronic device 900 according to embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital processor, a cellular phone, a smart phone, a wearable device, and other similar computing devices. The components shown herein, their connections and relationships, and their functions are described as examples only, and are not intended to limit implementations of the present disclosure described and/or claimed herein. The device 900 includes a computing unit 901 to perform various appropriate actions and processes according to computer program instructions stored in a read only memory (ROM) 902, or loaded from a storage unit 908 into a random access memory (RAM) 903. In the RAM 903, various programs and data for the operation of the storage device 900 can also be stored. The computing unit 901, the ROM 902, and the RAM 903 are connected to each other through a bus 904. An input/output (I/O) interface 905 is also connected to the bus 904.

Components in the device 900 are connected to the I/O interface 905, including: an input unit 906, such as a keyboard, a mouse; an output unit 907, such as various types of displays, speakers; a storage unit 908, such as a disk, an optical disk; and a communication unit 909, such as network cards, modems, wireless communication transceivers, and the like. The communication unit 909 allows the device 900 to exchange information/data with other devices through a computer network such as the Internet and/or various telecommunication networks. The computing unit 901 may be formed of various general-purpose and/or special-purpose processing components with processing and computing capabilities. Some examples of the computing unit 901 include, but are not limited to, a central processing unit (CPU), graphics processing unit (GPU), various specialized artificial intelligence (AI) computing chips, various computing units that run machine learning model algorithms, digital signal processor (DSP), and any suitable processor, controller, microcontroller, etc. The computing unit 901 performs various methods and processes described above, such as an image processing method. For example, in some embodiments, the image processing method may be implemented as computer software programs that are tangibly embodied on a machine-readable medium, such as the storage unit 908. In some embodiments, part or all of the computer program may be loaded and/or installed on the device 900 via the ROM 902 and/or the communication unit 909. When a computer program is loaded into the RAM 903 and executed by the computing unit 901, one or more steps of the image processing method described above may be performed. In some embodiments, the computing unit 901 may be configured to perform the image processing method in any other suitable manner (e.g., by means of firmware).

Various implementations of the systems and techniques described herein above may be implemented in digital electronic circuitry, integrated circuit systems, field programmable gate arrays (FPGA), application specific integrated circuits (ASIC), application specific standard products (ASSP), system-on-chip (SOC), complex programmable logic device (CPLD), computer hardware, firmware, software, and/or combinations thereof. These various embodiments may include being implemented in one or more computer programs executable and/or interpretable on a programmable system including at least one programmable processor, and the programmable processor may be a special-purpose or general-purpose programmable processor, and may receive data and instructions from a storage system, at least one input device and at least one output device, and may transmit data and instructions to the storage system, the at least one input device, and the at least one output device.

Program code for implementing the methods of the present disclosure may be written in any combination of one or more programming languages. These program codes may be provided to a processor or controller of a general computer, a dedicated computer, or other programmable data processing device, such that the program codes, when executed by the processor or controller, cause the functions and/or operations specified in the flow diagrams and/or block diagrams is performed. The program code can be executed entirely on the machine, partly on the machine, as a stand-alone software package partly on a machine and partly on a remote machine or entirely on a remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), erasable programmable read-only memories (EPROM or flash memory), fiber optics, compact disc read-only memories (CD-ROM), optical storage devices, magnetic storage devices, or any suitable combination of the foregoing.

To provide interaction with a user, the systems and techniques described herein may be implemented on a computer having a display device (e.g., a cathode ray tube (CRT) or liquid crystal display (LCD)) for displaying information for the user; and a keyboard and pointing device (e.g., a mouse or trackball) through which a user can provide an input to the computer. Other types of devices can also be used to provide interaction with the user, for example, the feedback provided to the user may be any form of sensory feedback (e.g., visual feedback, auditory feedback, or tactile feedback); and may be in any form (including acoustic input, voice input, or tactile input) to receive the input from the user.

The systems and techniques described herein may be implemented on a computing system that includes back-end components (e.g., as a data server), or a computing system that includes middleware components (e.g., an application server), or a computing system that includes front-end components (e.g., a user computer with a graphical user interface or web browser through which a user can interact with implementations of the systems and techniques described herein), or a computer system including such a backend components, middleware components, front-end components or any combination thereof. The components of the system may be interconnected by any form or medium of digital data communication (e.g., a communication network). Examples of the communication network includes: Local Area Networks (LAN), Wide Area Networks (WAN), the Internet and blockchain networks.

The computer system may include a client and a server. The Client and server are generally remote from each other and usually interact through a communication network. The relationship of the client and the server is generated by computer programs running on the respective computers and having a client-server relationship with each other. The server may be a cloud server, also known as a cloud computing server or a cloud host, which is a host product in the cloud computing service system, and solves the defects of difficult management and weak business expansion in traditional physical hosts and virtual private servers ("VPS" for short). The server may also be a server of a distributed system, or a server combined with a blockchain.

It should be understood that the steps may be reordered, added or deleted by using the various forms of flows shown above. For example, the steps described in the present disclosure may be executed in parallel, sequentially, or in different orders, as long as the desired results of the technical solutions in the present disclosure can be achieved, and no limitation is imposed herein.

The above-mentioned specific embodiments do not limit the scope of protection of the present disclosure. It should be understood by those skilled in the art that various modifications, combinations, sub-combinations and replacements may be made depending on design requirements and other factors. Any modifications, equivalent replacements, and improvements made within the principles of the present disclosure should be included within the protection scope of the present disclosure.

The invention claimed is:

1. A method of deriving a Decoder-side Intra Mode Derivation; (DIMD); predictor for respective samples of a coding unit; (CU); of a picture, the method comprising: selecting one or more Intra Prediction Modes; (IPMs); in a template area adjacent to the CU, determining blending weights for blending at least the one or more selected IPMs, and generating the DIMD predictor by blending the one or more selected IPMs using the determined blending weights for the CU so that the blending varies over the CU; wherein the method further comprises: splitting the CU into two or more CU regions, wherein the blending weights are determined, for each out of at least a subset of the two or more CU regions, dependent on the presence of the one or more selected IPMs in a part of the template area that is adjacent to the respective CU region, and wherein the DIMD predictor is generated using the determined blending weights determined for each CU region; wherein determining the blending weights comprises—for a CU region located adjacent to the template area, determining the blending weights dependent on a presence of the one or more selected IPMs in one or more template area regions or partial template area regions adjacent to the CU region, and—for a CU region located not adjacent to the template area, o selecting only a Planar mode as the DIMD predictor, or o selecting only a DC mode as the DIMD predictor, or o determining the blending weights by weighting blending weights of a CU region adjacent to a template area region.

2. The method of claim 1, wherein the one or more selected IPMs are selected using IPM statistics determined globally over the entire template area, the template area comprising a plurality of template area regions, wherein the selection is performed globally for the entire CU, or the selection involves a global selection of a set of IPMs for the entire CU, followed by a further region-wise selection out of the set of IPMs for each CU region.

3. The method of claim 1, wherein the one or more IPMs are selected using IPM statistics determined separately over each of a plurality of template area regions of the template area, the plurality of template area regions including a left template area region and an above template area region, or each of a plurality of partial template area regions of the template area, a partial template area region being a template area region adjacent only to one of the CU regions, and wherein the selection involves a region-wise selection out of the separately determined IPMs for each CU region.

4. The method of claim 1, wherein the one or more IPMs are selected in a manner aware of a subdivision of the template area into a plurality of template area regions, the plurality of template area regions including a left template area region and an above template area region, the template area further includes an above-left template area region, the above-left template area region being allocated to the above template area region, or to the left template area region, or to both the above template area region and the left template area region, or as an additional template area region, and/or wherein the one or more IPMs are selected in a manner aware of a subdivision of the template area into a plurality of partial template area regions, the partial template area regions are defined by splitting the template area with the same vertical and/or horizontal lines as the CU when defining the two or more CU regions.

5. The method of claim 4, wherein one or more first IPMs are selected in a template area region of the template area, and one or more second IPMs are selected in a partial template area region of the template area, and wherein if the CU has a rectangular shape, the first IPM is selected in the template area region adjacent to a longer size of the CU, and the second IPM is selected in the partial template area region adjacent to a shorter size of the CU, or selecting the first IPM and the second IPM in the template area region or from the partial template area region adjacent to the CU depends on a direction of a peak IPM in the template area region or in the entire template area.

6. The method of claim 4, wherein, in case two or more IPMs are selected, at least some but not all of the IPMs are selected using IPM statistics determined globally over the entire template area and remaining IPMs are selected using IPM statistics determined for a template area region or a partial template area region adjacent to the CU region, or wherein, in case two IPMs are selected, a first IPM in the entire template area is selected and if there is no second IPM from the template area region or the partial template area region adjacent to the CU region, the first IPM is used as the DIMD predictor, or the first IPM is blended with a Planar or DC mode using a predefined weight to obtain the DIMD predictor, if there is a second IPM selected in the template area region or the partial template area region adjacent to the CU region if the second IPM is different from the first IPM, blend the first IPM and the second IPM to obtain the DIMD predictor, if the second IPM is equal to the first IPM, select a further IPM in the template area region adjacent to the CU region and blend the first IPM and the further IPM to obtain the DIMD predictor.

7. The method of claim 6, wherein for a CU region located not adjacent to any of the template area regions, only the first IPM is used as the DIMD predictor, only the Planar mode is used as the DIMD predictor, only the DC mode is used as the DIMD predictor, or the first IPM is blended with the Planar or DC mode using a predefined weight to obtain the DIMD predictor.

8. The method of claim 1, wherein, in case more than one IPM is selected if the IPMs are present in a template area region adjacent to a CU region, the blending weights associated with the IPMs are used, if only one of the IPMs is present in a template area region adjacent to a CU region, the blending weight associated with the one IPM or a weighted blending weight associated with the one IPM is used, and the blending weight associated with any other IPM is set to a predefined value, or if no IPM is present in the adjacent template area region of the CU region, the blending weights associated with the IPMs are set to a predefined value, or wherein, in case one IPM is selected if the one IPM is present in a template area region adjacent to a CU region, the blending weight associated with the one IPM or a weighted blending weight associated with the one IPM is used, and the blending weight associated with any other IPM is set to a predefined value, if the one IPM is not present in a template area region adjacent to a CU region, the blending weight associated with the one IPM and the blending weight associated with any other IPM are set to a predefined value, or wherein in case no IPM is selected, the blending weight associated with any other IPM is set to a predefined value.

9. The method of claim 1, wherein for a CU region, which is located adjacent to a first template area region for which no IPM is selected and which is distant from a second template area region for which one or more IPMs are selected, the blending weights are weighted blending weights of the CU region adjacent to the second template area region, or for a CU region, which is located adjacent to a first template area region for which a first IPM is selected and which is distant from a second template area region for which a second IPM is selected, the blending weights for the second IPM is a weighted blending weight for the second IPM of the CU region adjacent to the second template area region.

10. A non-transitory computer-readable storage medium comprising instructions which, when executed by a computer, cause the computer to: select one or more Intra Prediction Modes (IPMs) in a template area adjacent to a coding unit (CU), determine blending weights for blending at least the one or more selected IPMs, and generate a DIMD predictor by blending the one or more selected IPMs using the determined blending weights for the CU so that the blending varies over the CU; wherein the instructions, when executed by a computer, cause the computer to: split the CU into two or more CU regions, wherein the blending weights are determined, for each out of at least a subset of the two or more CU regions, dependent on the presence of the one or more selected IPMs in a part of the template area that is adjacent to the respective CU region, and wherein the DIMD predictor is generated using the determined blending weights determined for each CU region: wherein determining the blending weights comprises—for a CU region located adjacent to the template area, determining the blending weights dependent on a presence of the one or more selected IPMs in one or more template area regions or partial template area regions adjacent to the CU region, and—for a CU region located not adjacent to the template area, o selecting only a Planar mode as the DIMD predictor, or o selecting only a DC mode as the DIMD predictor, or o determining the blending weights by weighting blending weights of a CU region adjacent to a template area region.

11. An apparatus for deriving a Decoder-side Intra Mode Derivation (DIMD) predictor for respective samples of a coding unit (CU) of a picture, the apparatus comprising: a memory for storing instructions; and a processor; wherein the processor is configured to: select one or more Intra Prediction Modes (IPMs) in a template area adjacent to the CU, determine blending weights for blending at least the one or more selected IPMs, and generate the DIMD predictor by blending the one or more selected IPMs using the determined blending weights for the CU so that the blending varies over the CU; wherein the processor is further configured to: split the CU into two or more CU regions, wherein the blending weights are determined, for each out of at least a subset of the two or more CU regions, dependent on the presence of the one or more selected IPMs in a part of the template area that is adjacent to the respective CU region, and wherein the DIMD predictor is generated using the determined blending weights determined for each CU region; wherein determining the blending weights comprises—for a CU region located adjacent to the template area, determining the blending weights dependent on a presence of the one or more selected IPMs in one or more template area regions or partial template area regions adjacent to the CU region, and—for a CU region located not adjacent to the template area, o selecting only a Planar mode as the DIMD predictor, or o selecting only a DC mode as the DIMD predictor, or o determining the blending weights by weighting blending weights of a CU region adjacent to a template area region.

12. The method of claim 2, wherein the one or more IPMs are selected from a Histogram of Gradients, (HoG).

13. The method of claim 5, wherein a main direction of the peak IPM computed in the template area region or in the entire template area is more vertical than horizontal, the first IPM is selected in the left or above template area region adjacent to the CU region, and the second IPM is selected in the partial above or left template area region adjacent to the CU region.

14. The method of claim 5, wherein a main direction of the peak IPM computed in the template area region or in the entire template is more horizontal than vertical, the first IPM is selected in the above or left template area region, and the second IPM is selected in the partial left or above template area region adjacent to the CU region.

15. The method of claim 5, wherein, in case two or more IPMs are selected, at least some but not all of the IPMs are selected using IPM statistics determined globally over the entire template area and remaining IPMs are selected using IPM statistics determined for a template area region or a partial template area region adjacent to the CU region, or wherein, in case two IPMs are selected, a first IPM in the entire template area is selected and if there is no second IPM from the template area region or the partial template area region adjacent to the CU region, the first IPM is used as the DIMD predictor, or the first IPM is blended with a Planar or DC mode using a predefined weight to obtain the DIMD predictor, if there is a second IPM selected in the template area region or the partial template area region adjacent to the CU region if the second IPM is different from the first IPM, blend the first IPM and the second IPM to obtain the DIMD predictor, if the second IPM is equal to the first IPM, select a further IPM in the template area region adjacent to the CU region and blend the first IPM and the further IPM to obtain the DIMD predictor.

16. The method of claim 8, wherein a blending weight associated with a Planar or DC mode is set to a predefined value.

17. The non-transitory computer-readable storage medium of claim 10, wherein the one or more IPMs are selected using IPM statistics determined globally over the entire template area, the template area comprising a plurality of template area regions, wherein the selection is performed globally for the entire CU, or the selection involves a global selection of a set of IPMs for the entire CU, followed by a further region-wise selection out of the set of IPMs for each CU region.

18. The apparatus of claim 11, wherein the one or more selected IPMs are selected using IPM statistics determined globally over the entire template area, the template area comprising a plurality of template area regions, wherein—the selection is performed globally for the entire CU, or the selection involves a global selection of a set of IPMs for the entire CU, followed by a further region-wise selection out of the set of IPMs for each CU region.

* * * * *